US006748349B1

(12) United States Patent
Majumdar et al.

(10) Patent No.: US 6,748,349 B1
(45) Date of Patent: Jun. 8, 2004

(54) GENERALIZED FLUID SYSTEM SIMULATION PROGRAM

(75) Inventors: Alok Kumar Majumdar, Huntsville, AL (US); John W. Bailey, Huntsville, AL (US); Paul Alan Schallhorn, Huntsville, AL (US); Todd E. Steadman, Prospect, TN (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/313,576

(22) Filed: May 7, 1999

(51) Int. Cl.$^7$ ................................................. G06G 7/48
(52) U.S. Cl. ................................... 703/9; 703/6; 703/2
(58) Field of Search ..................... 703/9, 6; 342/357.04

(56) References Cited

U.S. PATENT DOCUMENTS

| | | | | | |
|---|---|---|---|---|---|
| 4,766,558 | A | * | 8/1988 | Luks et al. | 166/252.1 |
| 5,354,376 | A | * | 10/1994 | Aidun | 118/410 |
| 5,732,192 | A | * | 3/1998 | Fleming | 395/10 |
| 6,041,263 | A | * | 3/2000 | Boys | 700/32 |
| 6,114,995 | A | * | 9/2000 | Ketchum | 342/357.04 |
| 6,336,085 | B1 | * | 1/2002 | Igarashi | 703/9 |

OTHER PUBLICATIONS

Roland W. Jeppson, "Chapter IV Imcompressible Flow in Pipe Networks," Analysis of Flow in Pipe Networks, Ann Arbor Science (Ann Arbor, MI),.
"The Crane Companion to Flow of Fluids Through Valves, Fittings, and Pipes", The Crane Companion Users Manual, 3rd ed.,(Joliet, IL) 1996.
"Protopipe for Windows Version 1.0,"Version 1 ed., Kelix Software Systems (Baton Rouge, LA),.
P. G. Anderson et al., "Fluid Flow Anaysis of the SSME High Pressure Oxidizer Turbopump Operating at Full Power Level," Lockheed Missiles & Space Company, Inc. (Huntsville, AL), (Aug. 1, 1980).

Robert C. Hendricks et al., "WASP—A Flexible Fortran IV Computer Code for Calculating Water and Steam Properties," Lewis Research Center (Cleveland, OH).

Robert C. Hendricks et al., "GASP—A Computer Code for Calculating the Thermodynamic and Transport Properties for Ten Fluids: Parahydrogen, Helium, Neon, Methane, Nitrogen, Carbon Monoxide, Oxygen, Fluorine, Argon, and Carbon Dioxide," Lewis Research Center (Cleveland, OH), (Feb. 3, 1975).

W. F. Stoecker, "Chapter VI System Simulation," Design of Thermal Systems, Third ed., McGraw–Hill, Inc. (New York, NY),.

* cited by examiner

Primary Examiner—Russell Frejd
Assistant Examiner—Eduardo Garcia-Otero
(74) Attorney, Agent, or Firm—James J. McGroary; George F. Helfrich

(57) ABSTRACT

A general purpose program implemented on a computer analyzes steady state and transient flow in a complex fluid network, modeling phase changes, compressibility, mixture thermodynamics and external body forces such as gravity and centrifugal force. A preprocessor provides for the interactive development of a fluid network simulation having nodes and branches. Mass, energy, and specie conservation equations are solved at the nodes, and momentum conservation equations are solved in the branches. Contained herein are subroutines for computing "real fluid" thermodynamic and thermophysical properties for 12 fluids, and a number of different source options are provided for modeling momentum sources or sinks in the branches. The system of equations describing the fluid network is solved by a hybrid numerical method that is a combination of the Newton-Raphson and successive substitution methods. Application and verification of this invention are provided through an example problem, which demonstrates that the predictions of the present invention compare most reasonably with test data.

3 Claims, 17 Drawing Sheets

Notes:
1) Number of Internal Nodes = 7.
2) Number of Branches = 12.
3) Total Number of Equations = 7 x 4 + 12 = 40.
4) Number of Equations Solved by Newton-Raphson Method = 7 + 12 = 19.
5) Number of Equations Solved by Successive Substitution Method = 3 x 7 = 21.

GENERALIZED FLUID SYSTEM SIMULATION PROGRAM

ORIGIN OF THE INVENTION

The invention described herein was made in the performance of work under a NASA Contract and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

The present invention relates generally to steady state and transient flow in a complex fluid network. It relates in particular to a program implemented on a computer for analyzing steady state and transient flow in a complex fluid network to provide modeling of phase changes, compressibility, mixture thermodynamics, and external body forces.

2. Description of Related Art

A fluid flow network consists of a group of flow branches, such as pipes and ducts, that are joined together at a number of nodes. They can range from simple systems consisting of a few nodes and branches to very complex networks containing many flow branches, simulating valves, orifices, bends, pumps and turbines. In the analysis of existing or proposed networks, some node pressures and temperatures are specified or known. The problem is usually to determine all unknown nodal pressures, temperatures and branch flow rates.

An accurate prediction of axial thrust in a liquid rocket engine turbopump requires the modeling of fluid flow in a very complex network. Such a network involves the flow of cryogenic fluid through extremely narrow passages, flow between rotating and stationary surfaces, phase changes, mixing of fluids and heat transfer. Propellant feed system designers are often required to analyze pressurization or blow down processes in flow circuits consisting of many series and parallel flow branches containing various pipe fittings and valves using cryogenic fluids.

Available commercial systems including computer codes are generally suitable for steady-state, single phase incompressible flow. Because of the confidential proprietary nature of such codes, it is not possible to extend their capability to satisfy the above mentioned needs. In the past, specific purpose codes were developed to model the Space Shuttle Main Engine (SSME) turbopump. However, it was difficult to use those codes for a new design without making extensive changes in the original code. Such efforts often turned out to be time consuming and inefficient. Therefore, the present Generalized Fluid System Simulation Program (GFSSP) has been developed as a general fluid flow system solver capable of handling phase changes, compressibility, mixture thermodynamics and transient operations. It also includes the capability to model external body forces, such as gravity and centrifugal effects, in a complex flow network.

The oldest method for systematically solving a problem consisting of steady flow in a pipe network is the Hardy Cross method. Hardy Cross, "Analysis of Flow in Networks of Conduits or Conductors", Univ. Ill., Bull. 286, November, 1936. Not only is this method suited for solutions generated by hand, but it has also been widely employed for use in computer generated solutions. But as computers allowed much larger networks to be analyzed, it became apparent that the convergence of the Hardy Cross method might be very slow or even fail to provide a solution in some cases. The main reason for this numerical difficulty is that the Hardy Cross method does not solve the system of equations simultaneously. It considers a portion of the flow network to determine the continuity and momentum errors. The head loss and the flow rates are corrected, and then it proceeds to an adjacent portion of the circuit. This process is continued until the whole circuit is completed. This sequence of operations is repeated until the continuity and momentum errors are minimized. It is evident that the Hardy Cross method belongs in the category of successive substitution methods, and it is therefore likely that it may encounter convergence difficulties for large circuits. In later years, the Newton-Raphson method has been utilized to solve large networks, and with improvements in algorithms based on the Newton-Raphson method, computer storage requirements are not much larger than those needed by the Hardy Cross method. See Jeppson, Ronald W., "Analysis of Flow in Pipe Networks", Ann Arbor Science, 1977.

The flow of fluid in a rocket engine turbopump can be classified into two main categories. The flow through the impeller and turbine blade passages is designated as primary flow. Controlled leakage flow through bearings and seals for the purpose of axial thrust balance, bearing cooling and rotodynamic stability is referred to as secondary flow. Flows in the blade passages are modeled by solving Naiver-Stokes equations of mass, momentum and energy conservation in three dimensions. Naiver-Stokes methods, however, are not particularly suitable for modeling flow distribution in a complex network.

Most of the available commercial software packages for solving flow networks are based on either the successive substitution method or on the Newton-Raphson method, and they are only applicable for a single phase incompressible fluid. Crane Company, "Flow of Fluids Through Valves, Fittings and Pipe", Technical Paper No. 410, 1969; Kelix Software System, "Protopipe for Windows, Version 1.0, 1993–95. These are not suitable for modeling rocket engine turbopumps where mixing, phase change and rotational effects are present. Public domain computer programs have been developed in the aerospace industry to analyze the secondary flow in the SSME turbopumps. These programs use real gas properties to compute variable density in the flow passage. Mixing of fluids, phase changes and rotational effects, however, are not considered by these programs. See, e.g., Anderson, P. G., et al., "Fluid Flow Analysis of the SSME High Pressure Oxidizer Turbopump", Lockheed Report No. LMSC-HREC TR D698083, August 1980.

SUMMARY OF THE INVENTION

It is therefor a primary object of the present invention to provide what has been heretofore unavailable in the prior art, viz., a robust and efficient computer implemented program to solve a system of equations describing a flow network containing phase changes, mixing and rotation, thereby affording practical modeling of phase changes, compressibility, mixture thermodynamics and external body forces—all of which are objective results, highly useful and very much sought after by the design engineer.

The present invention is basically a general purpose computer program for analyzing steady state and transient flow in a complex network, the program being capable of modeling phase changes, compressibility, mixture thermodynamics and external body forces such as gravity and centrifugal. The program's preprocessor allows the user to interactively develop a fluid network simulation consisting of nodes and branches. Mass, energy and specie conservation equations are solved at the nodes; the momentum conservation equations are solved in the branches.

The present invention contains subroutines for computing "real fluid" thermodynamic and thermophysical properties for 12 fluids. The fluids are: helium, methane, neon, nitrogen, carbon monoxide, oxygen, argon, carbon dioxide, fluorine, hydrogen, water, and kerosene (RP-1). The program also provides the options of using any incompressible fluid with constant density and viscosity or ideal gas.

A number of different resistance/source options are applicable for modeling momentum sources or sinks in the branches. These options include: pipe flow, flow through a restriction, non-circular duct, pipe flow with entrance and/or exit losses, thin sharp orifice, thick orifice, square edge reduction, square edge expansion, rotating annular duct, rotating radial duct, labyrinth seal, parallel plates, common fittings and valves, pump characteristics, pump power, valve with a given loss coefficient, and a Joule-Thomson device.

The system of equations describing the fluid network is solved by a hybrid numerical method that is a combination of the Newton-Raphson and successive substitution methods. This invention is also applied and verified through demonstrated examples.

Earlier programs that were used to analyze flow in SSME turbomachinery used a very simplified form of the momentum equation, only considering pressure and frictional forces. A more generalized form of the momentum equation is necessary to account for rotational effects. The momentum equation used in GFSSP includes inertia, pressure, friction, gravity, centrifugal and any external momentum sources. The frictional effects are proportional to the square of mass flow rate in the branch. The proportionality constant was derived from empirical information available in the literature.

The thermodynamic and thermophysical properties required in the conservation equations are obtained from two thermodynamic property programs, GASP and WASP, Hendricks, R. C., Baron, A. K., and Peller, I. C., "A computer code for calculating the thermodynamic and transport properties for ten fluids: Parahydrogen, helium, neon, methane, nitrogen, carbon monoxide, oxygen, fluorine, argon, and carbon dioxide", NASA TN D-7808, February, 1975; Hendricks, R. C., Peller, I. C., and Baron, A. K., "WASP—A flexible Fortran IV computer code for calculating water and steam properties", NASA TN D-7391, November, 1973. GASP and WASP provide thermodynamic and thermophysical properties for helium, methane, neon, nitrogen, carbon monoxide, oxygen, argon, carbon dioxide, fluorine, hydrogen, and water. The properties of RP-1 fuel have been provided as a look up table. A real gas formulation has been used to compute mixture properties. The invention also includes the options of modeling any incompressible fluid of constant density and viscosity or an ideal gas.

The invention includes a preprocessor to facilitate the creation of the model. With the help of this preprocessor, a user without a substantial background in computational methods or the FORTRAN programming language can model complex flow circuits.

The task of the computational model is to obtain a simultaneous solution of the governing equations. This system of equations is solved by GFSSP utilizing a novel numerical procedure which is a combination of Newton-Raphson and successive substitution methods.

The capability to model transient flow is included in the present invention. The transient capability allows the user to model pressurization and blow down processes. GFSSP's transient predictions have been verified by comparing the predictions with the analytical solutions. The user is also provided with the capability to model a heat exchanger and a turbopump. An additional resistance option is provided to model the Joule-Thomson effect that occurs in a viscojet.

BRIEF DESCRIPTION OF THE DRAWINGS

For a more complete understanding of the present invention, including its primary object and benefits, reference should be made to the Description of the Preferred Embodiments, which is set forth below. This Description should be read together with the accompanying drawings, wherein:

FIGS. 12 and 12a are a representation of the results of the GFSSP model overlaid onto FIGS. 11 and 11a;

DESCRIPTION OF THE PREFERRED EMBODIMENTS

The present invention was developed on an IBM compatible PC using the Lahey EM32 FORTRAN compiler. The same source code also runs on a Silicon Graphics workstation and Macintosh. The code was developed with a modular structure to achieve two objectives. First, the code's solver module was separated from the preprocessor module such that users are not required to write any code to develop their models. Secondly, the code can easily be extended to enhance its capability by adding new modules. The main routine controls all of the program operations and makes the decisions whether to continue or to stop the calculations.

The present computer program has three major parts. The first part consists of the subroutines for the preprocessor. The preprocessor allows the user to interactively create the flow network model consisting of nodes and branches. All of the input specifications, including the boundary conditions, are specified through the preprocessor. The second major part of the program consists of the subroutines that provide the initial conditions and then develop and solve all of the conservation equations in the flow network. The third part of the program consists of the thermodynamic property programs, GASP and WASP, that provide the necessary thermodynamic and thermophysical property data required to solve the resulting system of equations.

Figure 1:
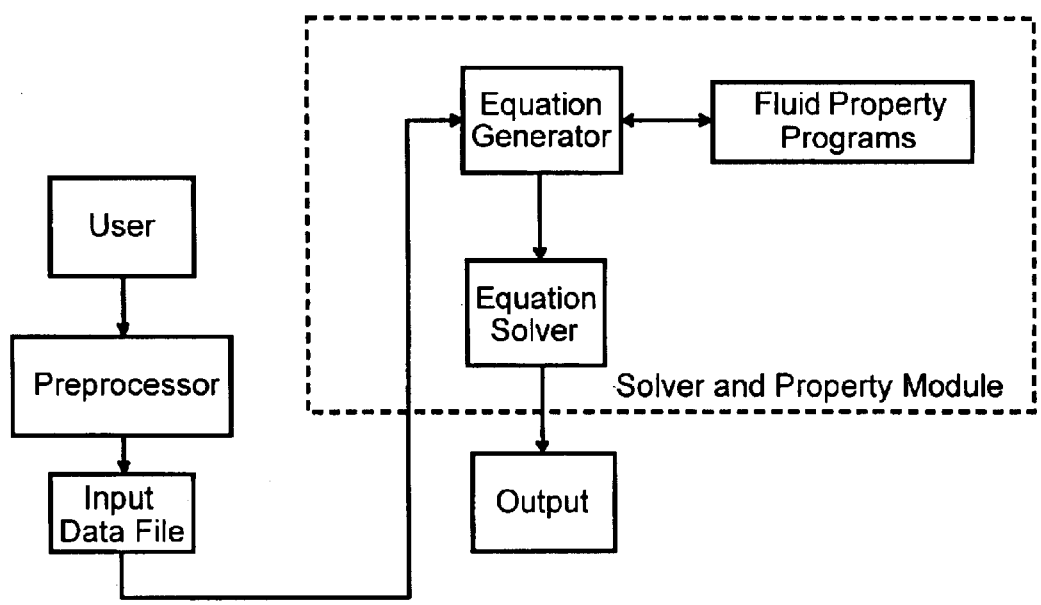
FIG. 1 is a general process flow diagram for the present invention.
Figure 2:
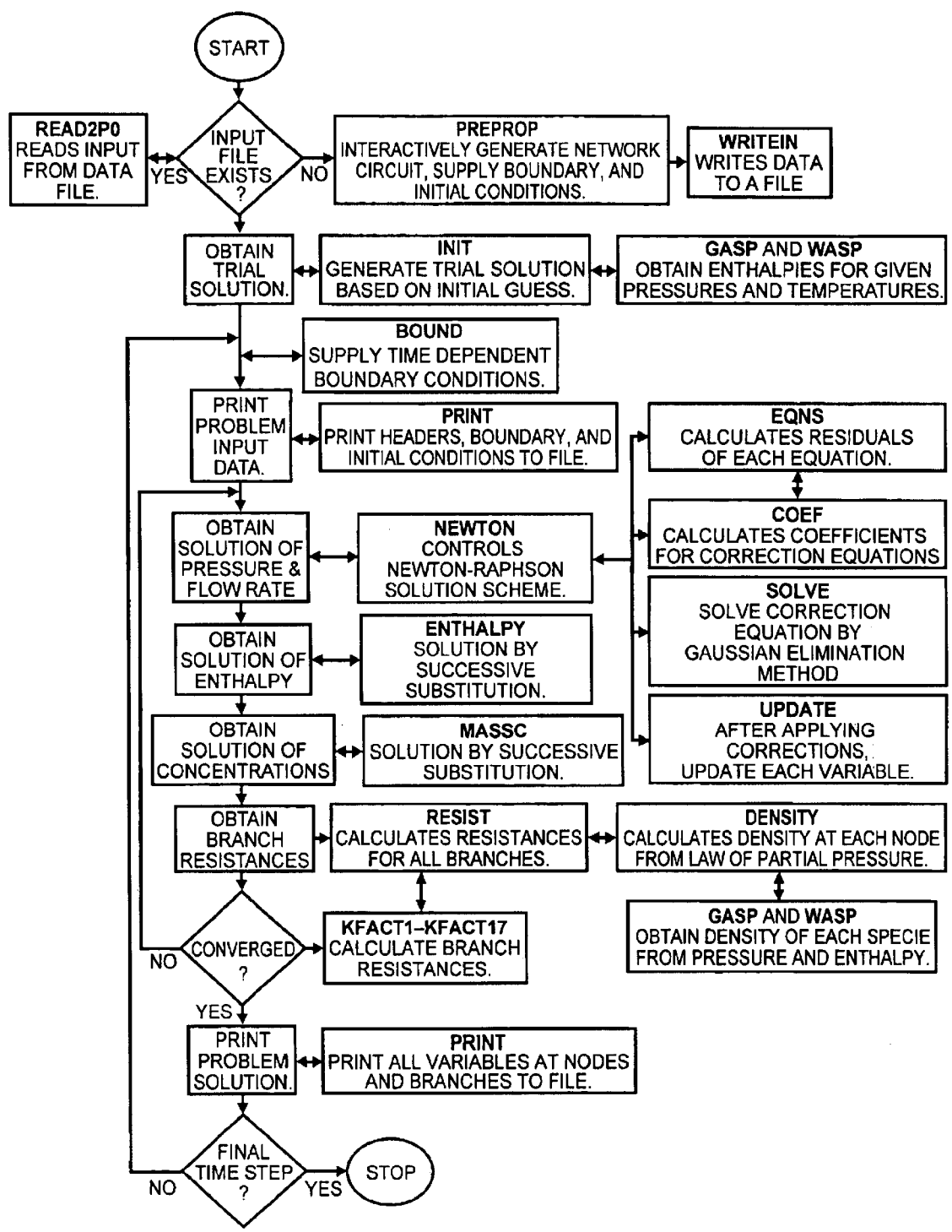
FIG. 2 is a flowchart showing major subroutines for the present invention.

FIG. 1 shows GFSSP's process flow diagram. The user runs the interactive preprocessor to generate the input data file. The input data file contains all of the information necessary for the model. The solver module reads the input data file and produces the solution in conjunction with the thermodynamic property programs. It should be noted that the user interfaces with the program only through the input data file. The user is never required to modify the source program to develop the model. The user is also not required to understand the structure of the solver module in order to develop their model. However, for the completeness of the documentation, a flow chart showing the major activities of the code is described in FIG. 2.

Preprocessor

The preprocessor consists of three subroutines. PREPROP is an interactive routine that allows the user to select the necessary logical options required for the particular flow mode. All of the flow network information required to define the model, including numbering and classification of nodes, the connecting branches, information to calculate branch resistance, the initial and boundary conditions, are provided through an interactive dialogue with the user. At the end of the interactive session, the input data is written by Subroutine WRITEIN to a text file. The code reads the input data file through Subroutine READ2PO.

Solver

The main program and the associated set of subroutines performs six major functions including: (1) the generation of a trial solution based on the initial guess, (2) supply time-dependent boundary conditions, (3) Newton-Raphson solution of the conservation equations, (4) successive substitution method of solving concentration equation, (5) the calculation of the flow resistance in the branches, and (6) prints input/output variables of the problem. The subroutine INIT generates a trial solution by interacting with thermodynamic property codes GASP and WASP, or the RP-1 property tables. Subroutine BOUND reads any applicable time-dependent boundary conditions from the model history files. Subroutine NEWTON conducts the Newton-Raphson solution of the mass conservation, flow rate and energy conservation equations with the help of the subroutines EQNS, COEF, SOLVE and UPDATE. The subroutine EQNS generates the equations. The coefficients of the correction equations are calculated in COEF. The correction equations are solved by the Gaussian Elimination method in SOLVE. After applying the corrections, the variables are updated in subroutine UPDATE. The resistance for each branch is calculated in RESIST following the calculation of fluid densities at each node in the subroutine DENSITY. The flow resistance coefficients ($K_f$) for each branch are computed in subroutines KFACT1 through KFACT17 depending upon the resistance option selected for a particular branch.

Thermodynamic Property Package

The thermodynamic property package included in GFSSP consists of two separate programs, GASP and WASP, and it also includes tabulated data for RP-1. The GASP and WASP programs consist of a number of subroutines. GASP provides the thermodynamic properties of water. RP-1 properties are provided in the form of tables. Subroutine RP1 searches for the required property values from these tables.

The thermodynamic property subroutines are called from two GFSSP subroutines, INIT and DENSITY. In subroutine INIT, enthalpies and densities are computed from given pressures and temperatures at the boundary and internal nodes. In subroutine DENSITY, density, temperatures, specific heats and specific heat ratios are calculated from given pressure and enthalpies at each node.

Presented now are descriptions of functions of code employed, as well as detailed instructions on how to create a data file, for any given flow circuit, with the help of the GFSSP interactive preprocessor. Also included is a detailed description of the contents of the model input data file.

GFSSP includes two different interactive preprocessors, one is referred to as the Command Line Preprocessor and the second is referred to as the Visual Preprocessor. The Command Line Preprocessor runs in the DOS, Unix and Macintosh environments and the Visual Preprocessor runs only under Windows NT™ or Windows 95™. The Command Line Preprocessor prompts the user to input the information required by the program to build the desired model through a series of sequential on screen questions or statements. The Visual Preprocessor provides a graphical user interface type of method for inputting the required model data through a series of menus and sub-menus. The following sections provide details for using both of these interactive preprocessors.

DOS Command Line Preprocessor

In order to run the code on a PC, the user must type the name of the GFSSP executable file, GFSSP2PC, at the DOS prompt. If the user has loaded the program and the associated files on the root directory of their 'C' drive, the command would appear as follows:

C:\GFSSP2PC

The first question the code will ask is:

"DO YOU WANT TO READ A DATA FILE?"

If the user answers 'yes' to this question, the code will prompt the user to supply an existing input data file name. After a successful reading of the input data file, GFSSP will proceed to calculate a solution for the specified model. If the user answers 'no' to the question, they are indicating to the program that they want to create a new model and the preprocessor subroutine will be invoked and the interactive session will begin.

The GFSSP preprocessor prompts asks the user for all of the necessary information to create the model input data file. After prompting the user for all of the data required to define the model, the code writes this data into a file specified by the user at the end of the interactive session. As part of the model definition process, the user will provide a file name to be used by the program for the output file and the analyst's name which is also recorded in the input and output files. Before building the desired model, the preprocessor will prompt the user to input a model title of less than or equal to 80 characters. After the preceding information has been input, the preprocessor will proceed to construct the model.

The sequence of inputs defining the model in the preprocessor are as follows:

1. Selection of model options
2. Node information
3. Branch information

4. Boundary conditions
5. Additional information

These steps will be discussed in detail in the following sections.

GFSSP offers the capability to model various physical situations. These capabilities are made available through model logical options which are set by the model builder to either 'true' or 'false'. The user can select one or more of these options during the development of a flow model. A complete listing of the available logical variables and their significance appear in Table 1.

During a model building session, the preprocessor will ask the user to select between various modeling options available in the code. The user can select the option by typing either an upper or lower case 'y' to activate the current option or 'n' to leave the option deselected. The code sets the logical variables either to TRUE or FALSE depending upon the user's answer to the preprocessor's prompt.

The interactive session is sequential. This implies that the preprocessor will prompt the user to supply information based on the choices made previously during this session. The following sections provide additional details for each of the available logical options.

TABLE 1

GFSSP Logical Variables

| Variable | Meaning |
| --- | --- |
| DENCON | = T; The program utilizes a user supplied constant density and viscosity. |
| | = F; All thermodynamic and thermophysical properties are computed. |
| GRAVITY | = T; Gravitational force effects will be calculated for branches utilizing Resistance Option 1 or 4. |
| | = F; Gravitational force effects are not calculated. |
| ENERGY | = T; The energy equation is solved (for DENCON = F and/or with heat sources). |
| | = F; The energy equation is not solved. |
| MIXTURE | = T; Used when there is more than one fluid in the circuit. |
| | = F; Used when there is single fluid in the circuit. |
| THRUST | = T; Axial thrust is calculated by the program from node pressures and areas. |
| | = F; Axial thrust is not calculated by the program. |
| STEADY | = T; Calculates a steady state solution for the given flow circuit. |
| | = F; Performs quasi-steady and unsteady calculations for the flow circuit with a given time history for the boundary conditions. |
| TRANSV | = T; This option allows the program to perform unsteady calculations. |
| | = F; Unsteady effect is neglected |
| SAVER | = T; This option allows the program to save the solution in a restart data file. |
| | = F; The solution is not saved to a restart data file. |
| HEX | = T; This option indicates to the program that the user wants to include a heat exchanger in the model. |
| | = F; This option indicates to the program that the user does not want to include a heat exchanger in the model. |
| HCOEF | = T; This option sets the program to calculate the overall heat transfer coefficient for a heat exchanger. |
| | = F; This option requires the user to supply the overall heat transfer coefficient for a heat exchanger. |
| REACTING | = F; This option is currently inactive and must be set to FALSE. |
| INERTIA | = T; The inertial effects of the fluid are considered. |
| | = F; The inertial effects of the fluid are neglected. |
| CONDX | = T; This option calculates heat conduction within the fluids. |
| | = F; Heat conduction within the fluids is neglected. |
| PRINTI | = T; This option prints out the initial flow field. |
| | = F; This option suppresses the print out of the initial flow field. |
| ROTATION | = T; This option allows the user to input branches with rotation. |
| | = F; Branch rotation is not activated. |
| BUOYANCY | = T; This option activates buoyancy when GRAVITY = .TRUE. |
| | = F; Buoyancy is not activated. |
| HRATE | = T; The applied heat load is in Btu/sec. |
| | = F; The applied heat load is in Btu/lb. |
| INVAL | = T; This option allows the program to read the initial flow field from a named restart data file. |
| | = F; The initial flow field is not read from a data file. |
| MSORCE | = T; This option allows the user to specify a momentum source in a given branch. |
| | = F; The user does not want to specify a momentum source. |
| MOVBND | = T; This option allows the user to model a moving boundary in a node. |
| | = F; The moving boundary option is not activated. |
| TPA | = T; This option allows the user to include a turbopump assembly. |
| | = F; This choice indicates that the user does not want to include a turbopump assembly. |
| VARGEO | = T; This option allows the user to model a time dependent geometry. |
| | = F; The model geometry is considered to be invariant in time. |
| TVM | = T; This option allows the user to model the transport of momentum in the transverse direction. |
| | = F; The transverse transport of momentum is neglected. |
| SHEAR | = T; This option allows the user to model transport of momentum by shear. |
| | = F; Momentum transport due to shear is neglected. |
| PRINTIN | = T; This option prints the model input data file information into the output file. |
| | = F; Input data file information is not printed into the output tile |
| PRNTADD | = T; This option prints additional thermodynamic and thermophysical property data into the output file. |
| | = F; Additional printout is not activated. |

Compressibility Option

The preprocessor will set the compressibility option based on the users response to the following question:

"IS DENSITY CONSTANT IN THE CIRCUIT?"

If the user answers 'yes' to this question, the program will assume a constant density within the fluid circuit and the user will be prompted to supply the density and viscosity of the fluid. If user answers 'no' to this question, the program will assume that the density can vary and will prompt the user, later in the model building process, to select the appropriate fluid or fluids, in the case of a mixture, from the GFSSP library of fluids. These related questions will be asked at the end of the "model options" portion of the current preprocessor interactive session.

Transient Option

The preprocessor will set the transient option based on the users response to the following question:

"IS FLOW TRANSIENT?"

GFSSP has the capability to model steady, quasi-steady and unsteady flow in any given flow system. If the user answers 'no' to the preceding question, a steady state flow will be assumed. If the user selects the transient option by responding to the preceding question with a 'yes', the program will require the user to distinguish between the quasi-steady and unsteady formulations. Therefore, to make the distinction, the program asks the following question:

"WILL NODE VOLUME BE SUPPLIED?"

The unsteady formulation requires node volume information. A 'yes' answer to this question will select an unsteady formulation, while a 'no' answer will lead to a quasi-steady formulation. For either the quasi-steady or the unsteady formulation, the user will be required to supply time step information by answering the following question:

"INPUT TIME STEP, START TIME, AND FINAL TIME IN SECONDS"

The numbers can either be separated by a comma or by a space. The 'enter' key must be pressed after the requested data has been input. If the user presses the enter key before supplying all of the data requested by the preprocessor, the program will not proceed until it receives the correct number of values.

For unsteady flow, the volume could be a function of time (e.g., positive displacement pump, squeeze film damper). The user can select that option by answering 'yes' to the following question:

WILL GEOMETRY BE FUNCTION OF TIME?

The user will be asked to provide the name of the data file containing the variable geometry information during the sequence of supplying boundary condition

Gravitation Option

The next preprocessor question is:

"DO YOU WANT TO ACTIVATE GRAVITY?"

If the user answers 'yes' to this question, the program will account for gravity effects in determining a solution for the current model. In other words, the gravitational term in Equation 2.1.2 found below will be included. The user will be asked to supply the orientation of the flow direction in the branches with respect to the gravitational force vector during the 'branch information' portion of the current preprocessor interactive session.

The next prompt the user must respond to is:

"DO YOU WANT TO ACTIVATE BUOYANCY?"

For a problem involving natural convection, the user must activate this option by responding with a 'y' at the prompt. In a situation where natural convection occurs, the fluid experiences a buoyancy force because of density differences in the presence of a gravitational field. Under the action of this force, the lighter fluid tends to move up. Therefore, the buoyancy force always acts in a direction opposite to the gravitational force. If this option is activated, the user must supply a reference point for calculating the density in the 'additional information' portion of the current preprocessor interactive session.

Fluid Inertia Option

For many flow situations involving incompressible flows, fluid inertia can be neglected. For such flows, the momentum equation (Equation 2.1.2 found below) represents a balance between the pressure force, friction force and body force. When analyzing compressible flows, the inertia force must be accounted for in most flow simulations. However, there are situations when dealing with compressible flows that the user may want to use a simplified version of the flow rate equation (Equation 2.1.2.c) which implicitly accounts for the inertial effect. To accurately model the flow in a converging-diverging nozzle, the user must include the inertia force. To include the inertia force in the compressible flow formulation, the user must answer 'yes' to the following question:

"DO YOU WANT TO ACTIVATE INERTIA?"

If this option is selected, the user will also be required to provide the angle between the upstream and downstream branches.

Rotation Option

Rotating flow occurs in turbomachinery on the front and back sides of the impeller. In such flows, the axis of rotation is perpendicular to the flow direction and the flow is subjected to centrifugal force. Under these circumstances, the centrifugal force in Equation 2.1.2 must be activated by answering 'yes' to the following question:

"DO YOU WANT TO ACTIVATE ROTATION?"

GFSSP allows the user to model rotating flows in branches to account for the centrifugal forces on the fluid that occur in these branches due to the rotation. When the axis of rotation is not parallel to the main flow direction, the fluid experiences centrifugal force. The magnitude of the centrifugal force depends on the radii of the axis of rotation and on the angular speed of the fluid. If this option is activated, the appropriate questions are asked in the 'additional information' portion of the current preprocessor interactive session.

External Momentum Source Option

The user has an option to add external momentum sources in a particular branch. This external momentum source is included as the 'S' term in Equation 2.1.2 and could be due to any other body or surface force that was not accounted for elsewhere. The user can activate this option by answering 'yes' to the following question:

"IS THERE ANY MOMENTUM SOURCE?"

If this option is activated, the associated questions are asked in the 'additional information' portion of the current preprocessor interactive session.

Axial Thrust Calculation Option

One of the main objectives for developing GFSSP was to provide a tool that could accurately calculate the axial thrust that occurs in a rocket engine turbopump. This option can be activated by answering 'yes' to the following question:

"IS AXIAL THRUST CALCULATION REQUIRED IN THE CIRCUIT?"

This axial thrust is created when a pressure differential exists between opposing faces of a mechanism, such as a turbine disk. If the GFSSP axial thrust calculation option is activated, the user must supply surface areas normal to the thrust vector. If the normal vector to the input surface area aligns with the thrust vector, the magnitude of the surface area, in square inches ($in^2$), is entered with a positive sign. The surface area must be entered with a negative sign if a normal vector to the given surface area is opposite to the given direction of the thrust vector. The user may choose to update the data file, using a text editor, to supply the areas once the data file is created. In that case the user must answer 'no' to this question to avoid answering questions on areas during the interactive session.

Moving Boundary Option

A moving boundary is encountered in reciprocating machines and rotodynamic applications. There are two ways the user can model a moving boundary. In a steady state flow situation, the user is required to provide the surface area and velocity of the moving node. In an unsteady flow situation, the user is required to choose the variable geometry option. In either case, to select the moving boundary option the user must say 'yes' to the following question:

"IS THERE ANY MOVING BOUNDARY?"

If this option is activated, the associated questions are asked in the 'additional information' portion of the current preprocessor interactive session.

External Heat Source Option

If the presence of heat sources or sinks in the flow circuit can affect the flow distribution, the user must activate this option by answering 'y' to the following question:

"ARE THERE ANY HEAT SOURCES?"

During the 'additional information' portion of the current preprocessor interactive session, the user will be required to identify the nodes where heat loads are applied and the magnitude of the heat loads in each of the identified nodes.

Heat Conduction Within Fluids Option

If the user wants to consider heat conduction within the fluid, the user can activate the heat conduction option between nodes by answering 'yes' to the following question:

"DO YOU WANT TO ACTIVATE HEAT CONDUCTION?"

If this option is activated, the user must supply the distances between nodes and the cross sectional areas normal to the heat conduction path flux during the 'branch information' portion of the current preprocessor interactive session.

Heat Exchanger Option

If the user wants to include any heat exchangers in the current model, the user must answer 'y' to the following question:

"IS THERE ANY HEAT EXCHANGER IN THE CIRCUIT?"

Figure 3:
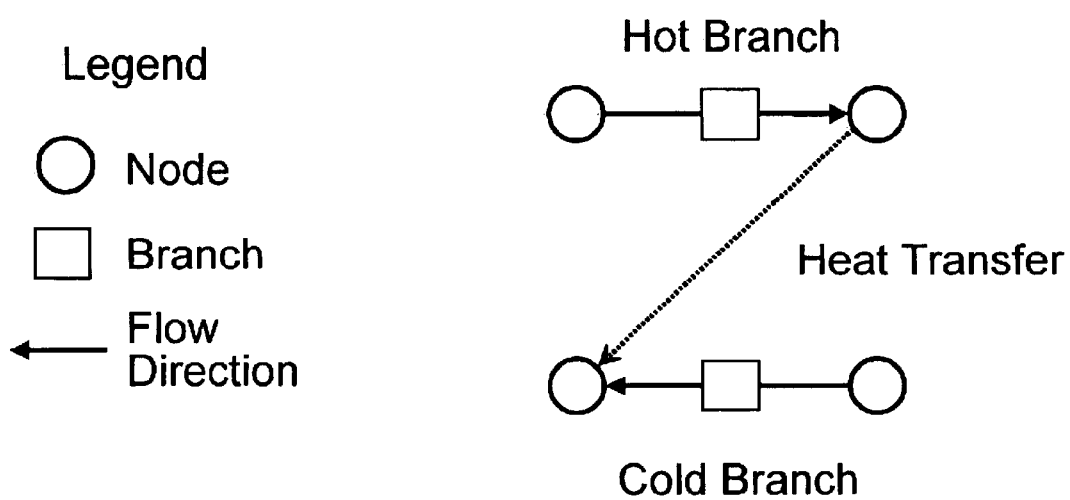
FIG. 3 is a schematic for use in modeling of a heat exchanger in a flow system.

This option allows the user to include a heat exchanger, as shown in FIG. 3, in a flow circuit. GFSSP has the capability to include ten heat exchangers in a flow system. If this option is activated, the user will be asked to provide the following information in the 'additional information' portion of the current preprocessor interactive session:

1. The number of heat exchangers to include in the circuit.
2. The branch names corresponding to the hot and cold branches of each heat exchanger.
3. User must select one of the following modeling methods:
   a Log Mean Temperature Difference Method
   b Effectiveness—NTU method
4. If the user chooses the Effectiveness—NTU method, the code will ask the user either to supply the effectiveness or to identify the type of heat exchanger so that the program can calculate the effectiveness from the built-in relationships. The code has built-in relationships for counter flow and parallel flow heat exchangers. For other types, such as cross flow, multipass, the effectiveness must be supplied by the user.

Turbopump Option

If the user wants to include any turbopumps in the current model, the user must answer 'y' to the following question:

"IS THERE ANY TURBOPUMP ASSEMBLY IN THE CIRCUIT?"

Figure 4:
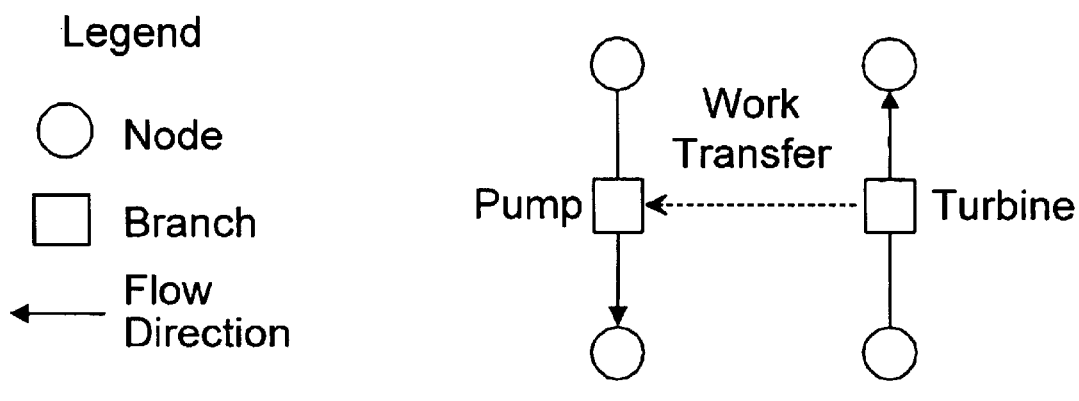
FIG. 4 is a schematic for use in modeling of a turbopump in a flow system.

This option allows the user to include a turbopump assembly (TPA) in a flow circuit as shown in FIG. 4. GFSSP has the capability to include ten turbopump assemblies in a flow system. If this option is activated, the user will be asked to provide the following information in the 'additional information' portion of the current preprocessor interactive session:

1. The number of turbopumps to include in the flow circuit.
2. Which branches correspond to the pump and turbine branches for each turbopump assembly.
3. The name of the file containing the pump performance characteristics.
4. The speed and efficiency of the turbine.

Fluid Selection Option

The next set of information the preprocessor will collect from the user concerns the fluid or fluids used in the flow circuit. The program will prompt the user to input whether or not multiple fluids are present in the system:

"IS THE FLUID A MIXTURE?"

Once the user answers this question, either 'y' or 'n', the code will print a list of fluids. The fluids available with GASP and WASP are shown below and in Table 2.

GFSSP has a Library of the Following Fluids

1—HELIUM
2—METHANE
3—NEON
4—NITROGEN
5—CARBON-MONOXIDE
6—OXYGEN
7—ARGON
8—CARBON-DIOXIDE
9—FLUORINE
10—HYDROGEN
11—WATER
12—RP1 (KEROSENE)

NOTE: RP1 PROPERTY RANGE HAS LIMITED VALIDITY;

PRESSURE RANGE: 0.01 TO 650 PSI

TEMPERATURE RANGE: 440 TO 600 R"

GFSSP can calculate the properties of the printed list of fluids. If the mixture option is not chosen, the user will need to identify only one fluid from the list. If the user answers 'yes' to the preceding question, the code will ask:

"HOW MANY OF THESE FLUIDS ARE PRESENT IN THE CIRCUIT?"

The user must provide the total number of fluids as well as identify the index number of each fluid that is present from the given list.

TABLE 2

Fluids Available in GFSSP

| Index | Fluid | Index | Fluid |
|---|---|---|---|
| 1 | HELIUM | 7 | ARGON |
| 2 | METHANE | 8 | CARBON DIOXIDE |
| 3 | NEON | 9 | FLUORINE |
| 4 | NITROGEN | 10 | HYDROGEN |
| 5 | CARBON MONOXIDE | 11 | WATER |
| 6 | OXYGEN | 12 | RP-1 |

Transverse Momentum Transport Option

GFSSP can be used to model multidimensional flow by extending the momentum conservation equation to account for momentum transport by the transverse component of the velocity and shearing stress. GFSSP's flow network of nodes and branches must be visualized as a grid network for a finite volume formulation of mass and momentum conservation equations. Instead of considering branches as a pipe and nodes as the junction of interconnected pipes, we may visualize the nodes as being the locations in a fluid continuum where all scalar properties such as pressures, temperatures and concentrations are located and the branches are paths through the fluid medium that connect the adjacent nodes. The vector properties, such as flow rate, are assumed to exist at a point located midway between two connected nodes.

Figure 5:
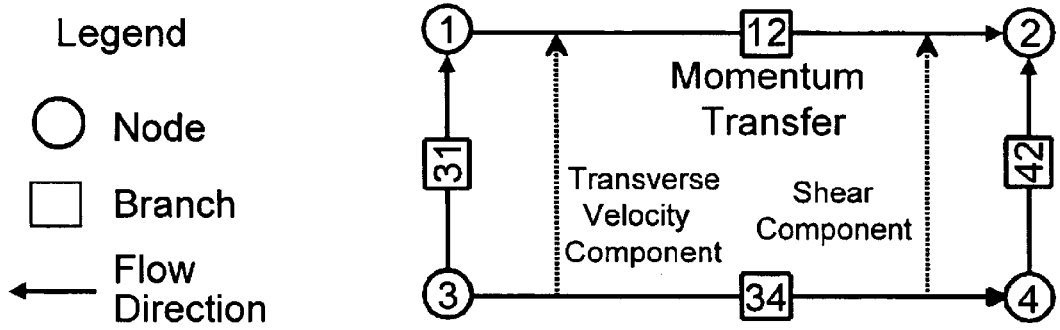
FIG. 5 is a schematic for use in multidimensional flow modeling.

FIG. 5 shows a multidimensional flow situation as modeled by GFSSP. In a multidimensional environment, the momentum conservation in branches 12 and 34 must account for inter-branch transport of momentum. There are two possible mechanisms of transport. First, momentum can be transported by shear when there is a velocity gradient between two parallel branches. Secondly, the momentum transport occurs due to transverse flow through branches 31 and 42. To activate multidimensional flow the user must respond with a 'y' to the two following questions asked by the preprocessor:

"DO YOU WANT TO ACTIVATE TRANSVERSE MOMENTUM?"

"DO YOU WANT TO ACTIVATE SHEAR?"

Once these options are activated, the user is required to supply the neighboring branch information for each branch where transverse momentum and shear transport are required to be calculated.

Print Control Option

The last of the program options that the user will be asked to set, relates to the data that will be included in the output file. The user will be asked to select three print control options. First, the code will ask:

"DO YOU WANT PRINT OUT OF INITIAL FIELD VALUES?"

If the user does not need to see the initial solution, the user should respond with a 'n' to this question. This will be followed by a second question:

"DO YOU WANT TO SUPPRESS PRINT OUT OF INPUT DATA?"

By accepting this option, the user can suppress the inclusion of information in the output file that is already available in the input data file.

GFSSP also provides an additional print control option used to activate an extended print out. If the user is interested to see a print out of enthalpy, entropy and thermophysical properties, an affirmative answer to the following question is required:

"DO YOU WANT EXTENDED PRINT OUT?"

Node Information

Following the completion of the portion of the interactive session that sets the required program logical options, the preprocessor prompts the user to input information for the nodes that will be used for the current model. The user will first be first required to supply the total number of nodes. The code will then ask to designate a number for each of the nodes. The numbering scheme is completely arbitrary. The user can devise any numbering scheme, using a maximum of four digits.

Next, the user is required to specify the type of each of the nodes. GFSSP allows two types of nodes. A node could be either an internal node or a boundary node. The code calculates pressures, temperatures and mixture concentrations at the internal nodes. On the other hand, the pressures, temperatures and concentrations must be supplied in the boundary nodes. GFSSP does not use the temperatures and concentrations at the outflow boundary nodes. However, the user must supply those values because GFSSP does not distinguish between inflow and outflow boundary nodes during problem setup. A boundary node can have either an inflow or outflow depending upon the specified boundary conditions.

The format of the questions in this portion of the current interactive session are as follows:

ENTER TOTAL NUMBER OF NODES

ENTER NUMBER ASSIGNED TO NODE 1

IS IT AN INTERNAL NODE?

The preprocessor will repeat the last two questions until the number of nodes input by the user has been reached.

Branch Information

After the user has completed the portion of the current interactive session that inputs the node information, the preprocessor prompts the user to input information for the branches that will be used for the current model. Every node in the circuit is connected to the circuit through at least one branch. The code will visit every internal node, identified by the user in the previous session, and ask the user to supply the number of branches connected with the internal node.

Next the preprocessor will prompt the user to supply the following information for each branch specified previously:

a. A branch number within four digits., b. The specified upstream and downstream nodes for the given branch., c. A branch type (resistance option) and all of the necessary information required for that resistance option.

If the gravity option is activated, the user must supply the angle that the branch makes with the gravity vector. If the heat conduction option is activated, the user must also supply the distances between the nodes and the cross sectional flow areas normal to the heat conduction flux.

The format of the questions in this portion of the current interactive session are as follows (the responses to the prompts are in bold):

HOW MANY BRANCHES ARE CONNECTED WITH NODE 2?

2

ENTER BRANCH NUMBER (J=1 OF 2) OF NODE 2

12

ENTER UPSTREAM NODE OF BRANCH NO. 12

1

ENTER DOWNSTREAM NODE OF BRANCH NO. 12

2

SELECT RESISTANCE OPTION FOR BRANCHES:
OPTION—1: PIPE FLOW
OPTION—2: FLOW THROUGH RESTRICTION
OPTION—3: NON-CIRCULAR DUCT
OPTION—4: PIPE FLOW WITH ENTRANCE & EXIT LOSS
OPTION—5: THIN SHARP ORIFICE
OPTION—6: THICK ORIFICE
OPTION—7: SQUARE REDUCTION
OPTION—8: SQUARE EXPANSION
OPTION—9: ROTATING ANNULAR DUCT
OPTION—10: ROTATING RADIAL DUCT
OPTION—11: LABY SEAL
OPTION—12: FACE SEAL
OPTION—13: COMMON FITTINGS & VALVES
OPTION—14: PUMP CHARACTERISTICS
OPTION—15: PUMP POWER PRESCRIPTION
OPTION—16: VALVE WITH GIVEN CV
OPTION—17: VISCOJET RESTRICTION

1

ENTER LENGTH (IN), DIAMETER (IN), & ROUGHNESS FACTOR(E/D) OF BRANCH 12

10,0.5,0.005

ENTER ANGLE WITH GRAVITY VECTOR (90 DEG FOR HORIZONTAL AXIS)
FOR BRANCH NO. 12

100

The preceding screen prompts will be repeated until all of the branch information has been entered. One branch naming convention that has been found to be useful in modeling flow circuits, is to give the branch a number that is a combination of the numbers assigned to the nodes that the branch connects. For example, if there are two nodes, Node 1 and Node 2, that are connected by one branch, the name for that branch would be 12 according to this convention. This technique has been found to be helpful in facilitating the comprehension of the model results.

Boundary Conditions

In this portion of the current interactive session, the user is required to supply pressures, temperatures and concentrations at all of the boundary nodes. For a steady state model, the format of the dialogue is as follows:

"ENTER PRESSURE (PSIA) & TEMPERATURE (DEG F.) FOR NODE 1"

This screen prompt will be repeated for each boundary node that has been identified.

For transient calculations, the user is required to supply the filename containing the history data for each boundary node in the model. The user will be prompted to provide the following information:

"ENTER FILENAME (20 CHARACTERS) FOR READING DATA HISTORY FOR NODE 1"

Additional Information

The following subsections discuss additional information that is required by the preprocessor that is dependent on which program options the user has incorporated into the current model. If the option has not been selected the associated prompts will not be displayed by the program.

Mass Source

The user will be prompted to declare whether or not there are internal nodes that have specified flow rates entering or leaving the node, excluding what the program calculates in the connected branches, with the following question:

"HOW MANY INTERNAL NODES HAVE SPECIFIED FLOWRATES?"

GFSSP requires the specification of pressure at all of the boundary nodes. The code calculates the flow rates in all of the branches. The code, however, has been provided with the capability of accepting a mass source or sink in the internal nodes. The user will enter a '0', if there is no such mass source in the circuit. Otherwise, the actual number of internal nodes with mass flowing into, or out of, must be typed. The code then will ask user to provide the following information for the supplied number of internal nodes:

a The internal node number.

b The mass source (a positive number) or mass sink (a negative number) in lb/sec.

The format of the questions will be as follows (the responses to the prompts are in bold):

HOW MANY INTERNAL NODES HAVE SPECIFIED FLOWRATES?

1

SPECIFY INTERNAL NODE NUMBER

2

SPECIFY FLOWRATE(LB./S) FOR NODE 2

1.0

Depending on the number entered by the user to the first question, the last two questions will be repeated until the necessary information has been entered.

Heat Source

The program will prompt the user to declare how many of the internal nodes have heat added to or removed from them with the following question:

"HOW MANY INTERNAL NODES HAVE SPECIFIED HEAT SOURCES?"

The user is prompted to supply the number of internal nodes where there are heat sources or sinks in the circuit. The user must enter a '0' if there is no such source in the circuit. Otherwise, the actual number must be typed. The heat source can be specified in either BTU/lb or in BTU/sec. The user must select the option (See Table 1, program option variable HRATE). The code then will ask the user to provide the following information for the input number of internal nodes:

a The internal node number.

b The heat source flux (a positive number) or sink flux (a negative number) in appropriate units.

The format of the questions will be as follows (the responses to the prompts are in bold):

HOW MANY INTERNAL NODES HAVE SPECIFIED HEAT SOURCES?
1
HEAT SOURCE SPECIFICATION HAS TWO OPTIONS
    1. SOURCE IN BTU/SEC
    2. SOURCE IN BTU/LB.
SELECT YOUR OPTION
2
SPECIFY INTERNAL NODE NUMBER
3
SPECIFY HEAT SOURCE(BTU/LB.) FOR NODE 3
1.0

Depending on the number entered by the user to the first question, the last three questions will be repeated until the necessary information has been entered.

Buoyancy

If buoyancy was activated earlier in the current interactive session, the following question will be asked:

"SPECIFY REFERENCE NODE FOR DENSITY"

When buoyancy is activated, the gravitational term in Equation 2.1.2 is replaced by a buoyancy term that requires a density difference term instead of a density. The user must define the reference node for the density difference term. It is preferable to select a boundary node to be the reference node.

Rotation

If the rotational option was activated earlier in the current interactive session, the user will be prompted with the question:

"HOW MANY BRANCHES HAVE THE ROTATING FLOWS?"

Once the user answers this question, the code will ask the user to provide the following information for the user supplied number of branches:

a) The branch number.
b) The upstream and downstream radius of the branch with respect to the axis of rotation.
c) The rotational speed and the factor representing the extent of the rotation of fluid with respect to the solid boundary.

The format of the questions will be as follows (the responses to the prompts are in bold):

HOW MANY BRANCHES HAVE ROTATING FLOWS?
1
SPECIFY BRANCH NUMBER
12
INPUT UPSTREAM AND DOWNSTREAM RADIUS OF BRANCH 12
1.0,3.0
INPUT ROTATIONAL SPEED (RPM) AND KFACTOR OF BRANCH 12
30,000,0.25

Depending on the number entered by the user to the first question, the last three questions will be repeated until the necessary information has been entered.

Momentum Source

If the momentum source option was activated earlier in the current interactive session, the following questions will be asked (the responses to the prompts are in bold):

HOW MANY BRANCHES HAVE MOMENTUM SOURCES?
1
SPECIFY BRANCH NUMBER
34
INPUT MOMENTUM SOURCE IN LBF FOR BRANCH 34
1.0

Depending on the number entered by the user to the first question, the last two questions will be repeated until the necessary information has been entered.

Heat Exchanger

If the heat exchanger option was activated earlier in the current interactive session, the following questions will be asked (the responses to the prompts are in bold):

HOW MANY HEAT EXCHANGERS(HEX) ARE THERE?
1
SPECIFY HOT & COLD BRANCH FOR HEX 1
12,34
SELECT YOUR MODELING OPTION
    1. LOG MEAN TEMP. DIF.(LMTD)
    2. EFFECTIVENESS-NTU
SELECT 1 OR 2
2
SUPPLY EFFECTIVENESS OF HEAT EXCHANGER 1
EFFECTIVENESS BETWEEN 0 TO 1, GFSSP USES THE VALUE
EFFECTIVENESS GREATER THAN 1, GFSSP COMPUTES THE VALUE
1.5
SPECIFY TYPE OF HEAT EXCHANGER
    1: COUNTER FLOW
    2: PARALLEL FLOW
1

Depending on the number entered by the user to the first question, the last four questions will be repeated until the necessary information has been entered.

Moving Boundary

If the moving boundary option was activated earlier in the current interactive session, the following questions will be asked (the responses to the prompts are in bold):

'HOW MANY NODES HAVE MOVING BOUNDARY?'
1
'SPECIFY NODE NUMBER'
10
'SPECIFY AREA(IN**2) & VELOCITY (FPS) OF 10'
1,10

Depending on the number entered by the user to the first question, the last two questions will be repeated until the necessary information has been entered.

Turbopump

If the turbopump option was activated earlier in the current interactive session, the following questions will be asked (the responses to the prompts are in bold):

HOW MANY TURBOPUMPS ARE IN THE CIRCUIT?
1
SPECIFY PUMP & TURBINE BRANCH FOR TPA 1
12,34
ENTER FILENAME(20 CHARACTERS) OF PUMP PERFORMANCE CURVE FOR BRANCH 12
PCURVE.DAT
SPECIFY SPEED AND EFFICIENCY OF TURBINE FOR BRANCH 34
30000,0.85

Depending on the number entered by the user to the first question, the last three questions will be repeated until the necessary information has been entered.

Multidimensional Flow

If the multidimensional flow option was activated earlier in the current interactive session, the following questions will be asked (the responses to the prompts are in bold):

Transverse Momentum

The following preprocessor prompts request information needed by the program to calculate the transverse momentum component of the flow:

INPUT BRANCH FOR WHICH TRANSVERSE MOMENTUM WILL BE CALCULATED
12
INPUT NUMBER (MAX 10) OF PARALLEL BRANCHES TO BRANCH 12
1
INPUT NAME OF 1 BRANCH WHICH IS PARALLEL TO 12
34
INPUT ANGLE BETWEEN 12 & 34
0
INPUT NUMBER OF TRANSVERSE BRANCHES CONNECTING BRANCH 12 AND 23 (MIN 2, MAX 5)
2
INPUT NAME OF 1 TRANSVERSE BRANCH BETWEEN 12 & 34
31
INPUT ANGLE BETWEEN 12 & 31
90
INPUT NAME OF 2 TRANSVERSE BRANCH BETWEEN 12 & 34
42
INPUT ANGLE BETWEEN 12 & 42
90

Depending on the number entered by the user to the first question, the last eight questions will be repeated until the necessary information has been entered.

Shear

The following preprocessor prompts request information needed by the program to calculate the shear component of the flow:

HOW MANY BRANCHES WILL HAVE SHEAR CALCULATED?
1
INPUT BRANCH FOR WHICH SHEAR WILL BE CALCULATED
12
INPUT NUMBER (MAX 10) OF PARALLEL BRANCHES TO BRANCH 12
1
INPUT NAME OF 1 PARALLEL BRANCH TO 34
INPUT ANGLE BETWEEN 12 AND 34
0
INPUT SHEAR AREA (IN^2) & DISTANCE (IN) BETWEEN 12 & 34
1.0,0.5
INPUT NUMBER (MAX OF 10) OF SOLIDS/WALLS PARALLEL TO BRANCH 1
VELOCITY OF SOLID/WALL+ANGLE BETWEEN SOLID/WALL & 12 (ft/sec)
10.0,0.0
INPUT SHEAR AREA (in^2) & DISTANCE (in) BETWEEN SOLID/WALL & 12
1.0,0.5

Depending on the number entered by the user to the first question, the last seven questions will be repeated until the necessary information has been entered.

Interactive Session Completion

At the end of the current interactive session, the user will be asked to provide a filename for use in naming the input and output data files for the current model and the preprocessor will also request the analyst's name. The questions that will be asked in sequence are:

ENTER FILENAME FOR WRITING THE INPUT DATA

DESCRIPTION OF THE INPUT DATA FILE

The previous sections describe how to create a GFSSP model of a fluid flow network using the available GFSSP preprocessors. The following section describes the structure of the GFSSP input data file that is created by the preprocessors. The data in the GFSSP input data file can be classified into the following 18 sections. The data file from a typical Example was used within this section to illustrate the content of the different sections of the input file:

1. Version Number:

The code prints a three digit version number:

GFSSP VERSION
200

2. Analyst's Name:

The code prints the analyst's name with a limit of 40 characters:

ANALYST
ALOK MAJUMDAR

3. Input Data File Name:

The code prints the input data file name with a limit of 40 characters:

INPUT DATA FILE NAME

EX1GP.DAT

4. Output Data File Name:

The code prints output data file name with a limit of 40 characters:

OUTPUT FILE NAME

EX1GP.OUT

5. Title:

The user can specify a model title of 80 characters or less:

TITLE

PUMP-SYSTEM CHARACTERISTICS

6. Logical Variables:

The settings for the twenty six program logical variables are provided in next four lines:

```
DENCON GRAVITY ENERGY MIXTURE THRUST STEADY TRANSV SAVER
  F      T      T      F      F      T      F     F
HEX HCOEF REACTING INERTIA CONDX PRINTI ROTATION
 F    F     F       F       F     F      F
BUOYANCY HRATE INVAL MSORCE MOVBND TPA VARGEO TVM
   F      F     F     F      F     F    F     F
SHEAR PRNTIN PRNTADD
  F    T      T
```

7. Node, Branch and Fluid Information:

```
NNODES    Number of nodes.
NINT      Number of internal nodes.
NBR       Number of branches.
NF        Number of fluids.
NNODES NINT NBR NF
   4    2    3   1
```

8. Relaxation Parameters:

| RELAXK | Under relaxation parameter for resistance ( Recommended value = 1.0). |
|---|---|
| RELAXD | Under relaxation parameter for density ( Recommended value = 0.5). |
| RELAXH | Under relaxation parameter for enthalpy ( Recommended value = 1.0). |

```
RELAXK   RELAXD    RELAXH   CC      NITER
1.000    0.500     1.000    0.100E-03  500
```

9. Index Number for Fluids:

The index number for each fluid is printed in this line. Table 2 above shows the fluids that are available in GFSSP.

| NFLUID(I),I= 1,NF |
|---|
| 11 |

10. Nodes and Indices:

In this section, the node numbers, NODE(I), and their indices, INDEX(I), are printed. INDEX(I)=1 implies an internal node and INDEX(I)=2 indicates a boundary node.

| NODE | INDEX |
|---|---|
| 1 | 2 |
| 2 | 1 |

-continued

| NODE | INDEX |
|---|---|
| 3 | 1 |
| 4 | 2 |

11. Node Information:

In this section, pressure, temperature, mass source, heat source and node areas are printed sequentially. Node areas are required only when the axial thrust calculation option is activated. For transient calculations, the code reads pressure, temperature and concentrations from a file defined in this part of the data file.

For STEADY=.TRUE.

| NODE | PRES (PSI) | TEMP(DEGF) | MASS SOURC | HEAT SOURC | THRST AREA |
|---|---|---|---|---|---|
| 1 | 0.1470E+02 | 0.6000E+02 | 0.0000E+00 | 0.0000E+00 | 0.0000E+00 |
| 2 | 0.1000E+02 | 0.6000E+02 | 0.0000E+00 | 0.0000E+00 | 0.0000E+00 |
| 3 | 0.4803E+02 | 0.6000E+02 | 0.0000E+00 | 0.0000E+00 | 0.0000E+00 |
| 4 | 0.1470E+02 | 0.6000E+02 | 0.0000E+00 | 0.0000E+00 | 0.0000E+00 |

For STEADY=.FALSE.

| NODE | PRES (PSI) | TEMP(DEGF) | MASS SOURC | HEAT SOURC | THRST | AREA |
|---|---|---|---|---|---|---|
| 1 | 0.100E+03 hist2.dat | 0.8000E+02 | 0.0000E+00 | 0.0000E+00 | 0.0000E+00 | 0.1728E+05 |

12. Branch Connection:

The number of branches connected to every internal node is defined within this portion of the input file. Also included in this section are the names of the connected branches.

INODE(I)—Internal node number.

NUMBR(I)—Number of branches connected with the $I^{th}$ internal node.

NAMEBR(I,J), J=1, NUMBR(I)—Name of the branches connected with the $I^{th}$ internal node.

| BRANCH | NOUBR | NMUBR |
|---|---|---|
| 12 | 0 | |
| 23 | 1 | 12 |
| 34 | 1 | 23 |

| BRANCH | NODBR | NMDBR |
|---|---|---|
| 12 | 1 | 23 |
| 23 | 1 | 34 |
| 34 | 0 | |

| INODE | NUMBR | BRANCH 1 | BRANCH 2 | BRANCH 3 | BRANCH 4 | BRANCH 5 | BRANCH 6 |
|---|---|---|---|---|---|---|---|
| 2 | 2 | 12 | 23 | | | | |
| 3 | 2 | 23 | 34 | | | | |

13. Branch Information:

Branch information is provided in this section. In the first part of this section, the branch number, upstream node, downstream node and selected resistance option are printed. In the second part, the required input parameters of every branch are printed in the same order as in the first part. A header is printed for every branch describing the required input parameters.

| BRANCH | UPNODE | DNNODE | OPTION |
|---|---|---|---|
| 12 | 1 | 2 | 14 |
| 23 | 2 | 3 | 13 |
| 34 | 3 | 4 | 1 |

BRANCH OPTION −14: PUMP CONST1, PUMP CONST2, AREA
   12   30888.00000   −0.00081   201.06177
BRANCH OPTION −13: DIA, K1, K2, AREA
   23   6.00000   1000.00000   0.10000   28.27431
BRANCH OPTION −1: LENGTH, DIA, EPSD, ANGLE, AREA
   34   18000.00000   6.00000   0.00500   95.74000   28.27431

14. Inertia Information:

In order to account for the inertial effects in the fluid flow model, the velocity in the upstream branch are required along with the angle between the branches. During the course of the calculation, if the flow rate becomes negative, the designated downstream branch becomes the upstream branch. Therefore, in this section, all of the upstream and downstream branches, for each branch in the flow circuit, are defined. In the first part of this section, the number of upstream branches and their designated numbers are listed. In the second part, the number of downstream branches and their designated numbers are listed. Finally the information about the angle the branch makes with its upstream and downstream neighbors are printed. The default values of the angle are set to zero. If the user wants to modify these angles, the user must use a text editor to alter the data file.

-continued

| BRANCH 12 | |
|---|---|
| UPSTRM BR. | ANGLE |
| DNSTRM BR. | ANGLE |
| 23 | 0.00 |
| BRANCH 23 | |
| UPSTRM BR. | ANGLE |
| 12 | 0.00 |
| DNSTRM BR. | ANGLE |
| 34 | 0.00 |
| BRANCH 34 | |
| UPSTRM BR. | ANGLE |
| 23 | 0.00 |
| DNSTRM BR. | ANGLE |

15. Rotation Information:

When the option ROTATION is set to TRUE, this section provides the related information. First, the number of rotating branches printed. This is followed by a table of related data:

BRANCH: Designated branch number.

RADU: Radial distance to the upstream node from the axis of rotation, in units of inches.

RADD: Radial distance to the downstream node from the axis of rotation, in units of inches.

RPM: Rotational speed of the branch in units of rpm.

AKROT: Empirical factor representing the ratio of the fluid and the solid surface speeds.

16. Heat Exchanger

If the heat exchanger option is activated (HEX=.TRUE.), the data file contains the following variables:

NHEX: Number of heat exchangers in the circuit

IBRHOT: Branch carrying hot fluid

IBRCLD: Branch carrying cold fluid

ITYPHX: Type of heat exchanger

ARHOT: Heat transfer area on hot side
ARCOLD: Heat transfer area on cold side
UA: Product of overall heat transfer coefficient and area
HEXEFF: Heat exchanger effectiveness 17. Moving Boundary If the moving boundary option is activated (MOVBND=.TRUE.), the data file contains the following variables:
NMNODE: Number of nodes with moving boundary
AREAN: Surface area of the node moving in to or away from the field
VBOUND: Velocity of the moving boundary (positive when moving into, negative when moving away from)

18. Restart

Two additional data files are required if the user has activated the restart option. If SAVER=.TRUE., the code saves node and branch information in two files. One file contains the node data and the other file contains the branch information. The user can select any twenty character name for these two files. In the example listed below the names of these files are FNODE.DAT and FBRANCH.DAT. If INVAL=.TRUE., the code reads node and branch information from these two data files for initial field values. This section of the data file appears as:

NODE DATA FILE
   FNODE.DAT
BRANCH DATA FILE
   FBRANCH.DAT

MATHEMATICAL FORMULATION

GFSSP assumes a Newtonian, non-reacting and one dimensional flow in the flow circuit. The flow can be either laminar or turbulent, incompressible or compressible, with or without heat transfer, phase change and mixing. The analysis of the flow and pressure distribution in a complex fluid flow network requires resolution of the system into nodes and branches. Nodes can be either boundary nodes or internal nodes. Pressures, temperatures, and concentrations of fluid species are specified at the boundary nodes. At each internal node, scalar properties such as pressures, temperatures, enthalpies, and mixture concentrations are computed. The flow rates (vector properties) are computed at the branches.

The purpose of the mathematical model is to predict the conditions at the internal nodes and the flow rates in the branches. A sample flow circuit consisting of 12 nodes and 12 branches is shown in FIG. 6 FIG. 6 shows a portion of the propellant flow circuit in a Pratt & Whitney High Pressure Oxygen Turbopump Secondary Flow Circuit, where a helium buffer is used to prevent the mixing of hydrogen and oxygen leakage flow.

Figure 6:
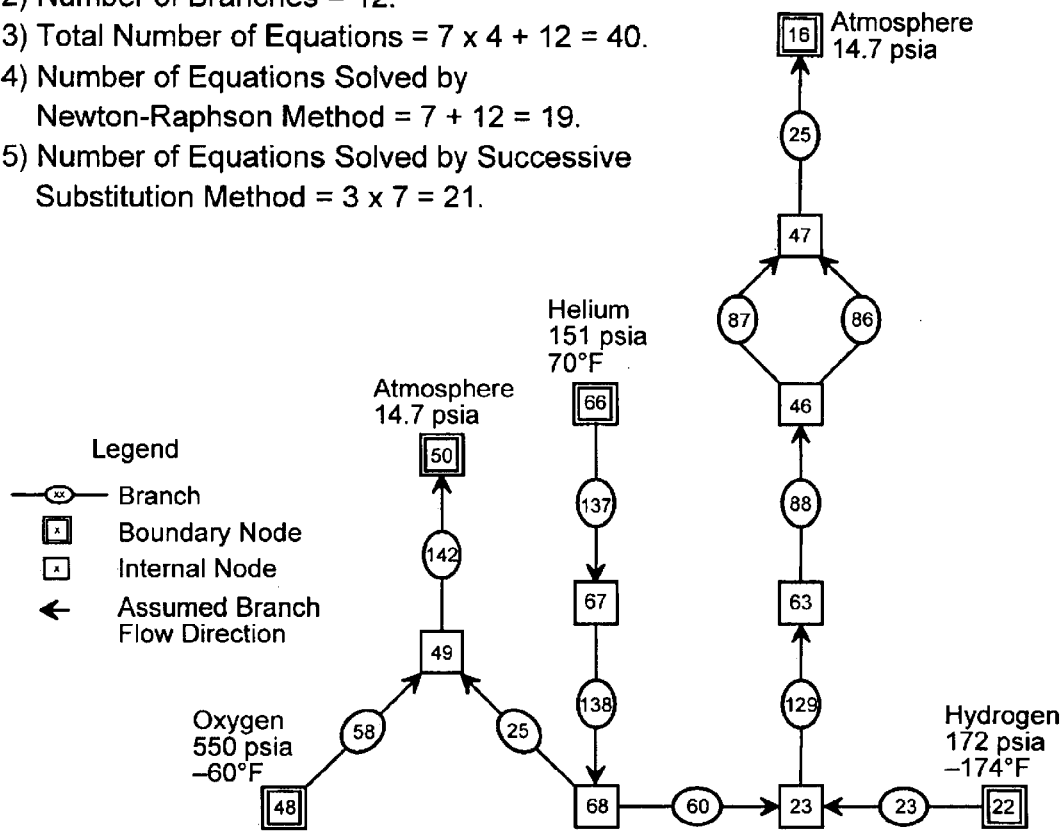
FIG. 6 is a schematic of an inter-propellant seal flow circuit in a turbopump.

The nodes and branches shown in FIG. 6 are numbered arbitrarily. There are five boundary nodes (48, 50, 66, 16, and 22) in the flow circuit. Oxygen, hydrogen, and helium enter into the circuit through nodes 48, 22, and 66 respectively. The pressures and temperatures are specified at these nodes and are shown in the figure. Nodes 50 and 16 are outflow boundaries where only pressures are specified. The mixtures of helium-oxygen and helium-hydrogen exit through these nodes. The computer code calculates pressures, temperatures, and fluid specie concentrations at all of the internal nodes and the flow rates in all of the branches.

Governing Equations

Figure 7:
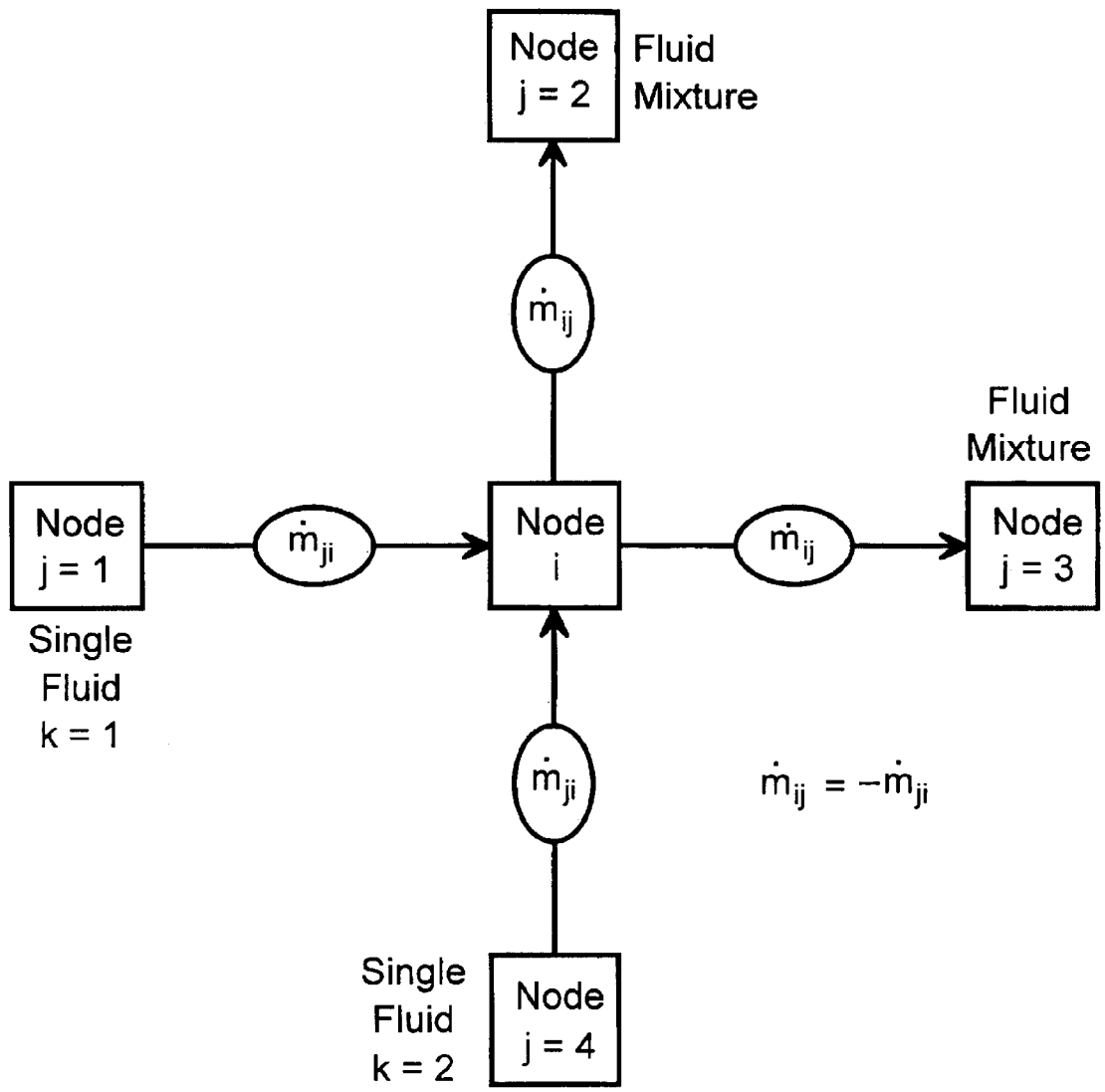
FIG. 7 is a schematic of GFSSP nodes, branches and indexing practice.

FIG. 7 displays a schematic showing adjacent nodes, their connecting branches, and the indexing system used by GFSSP. In order to solve for the unknown variables, mass, energy and fluid specie conservation equations are written for each internal node and flow rate equations are written for each branch.

Mass Conservation Equation $$\frac{m_{\tau+\Delta\tau} - m_\tau}{\Delta\tau} = \sum_{j=1}^{j=n} \dot{m}_{ij} \quad (2.1.1)$$

Equation 2.1.1 requires that, for the transient formulation, the net mass flow from a given node must equate to rate of change of mass in the control volume. In the steady state formulation, the left hand side of the equation is zero. This implies that the total mass flow rate into a node is equal to the total mass flow rate out of the node.

2.1.2 Momentum Conservation Equation

Figure 8:
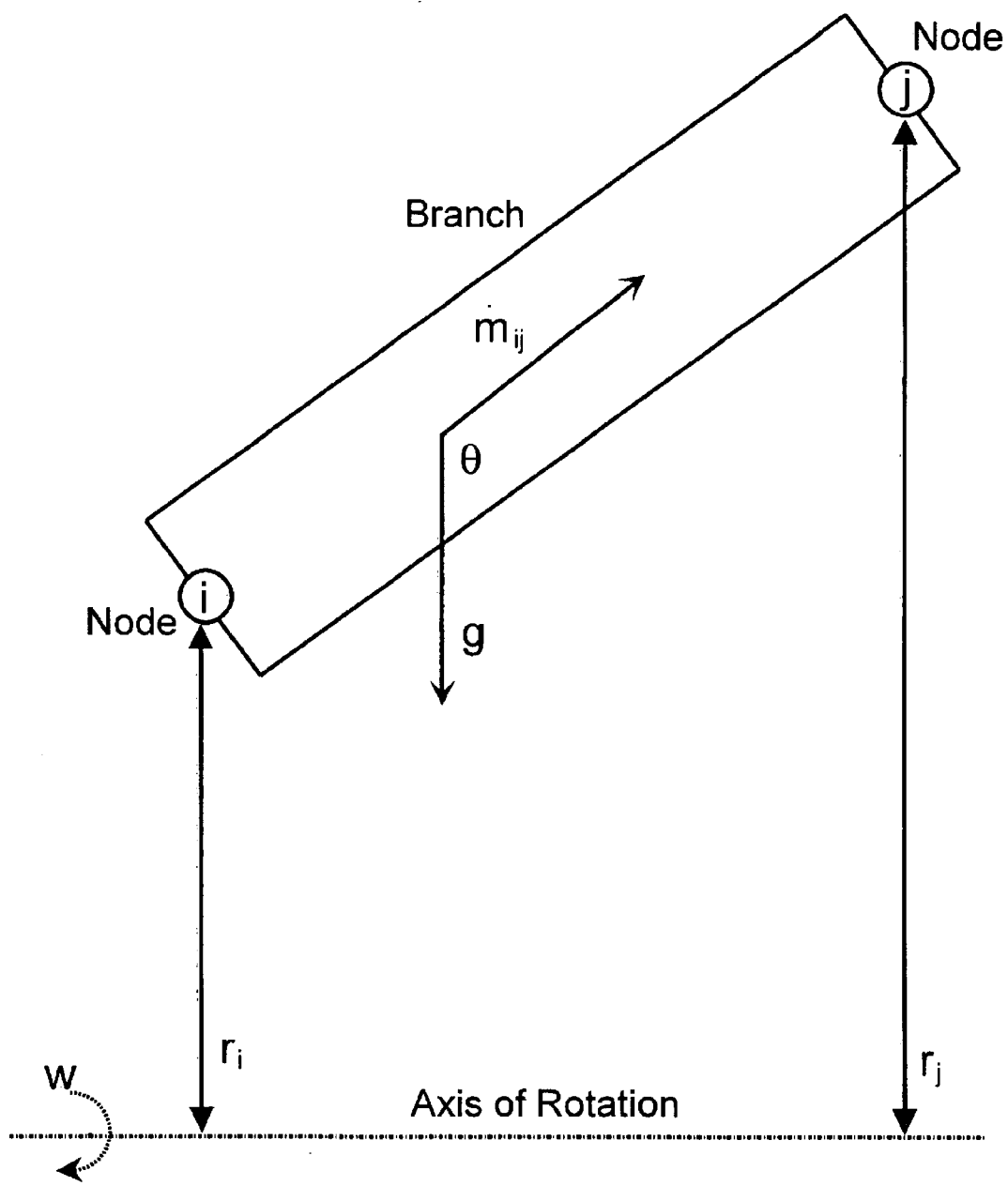
FIG. 8 is a schematic of a branch showing gravity and rotation.

The flow rate in a branch is calculated from the momentum conservation equation (Equation 2.1.2) which represents the balance of fluid forces acting on a given branch. A typical branch configuration is shown in FIG. 8. Inertia, pressure, gravity, friction and centrifugal forces are considered in the conservation equation. In addition to these five forces, a source term S has been provided in the equation to input pump characteristics or to input power to a pump in a given branch. If a pump is located in a given branch, all other forces except pressure are set to zero. The source term, S, is set to zero in all branches without a pump.

$$\frac{(m_u{}_{\tau+\Delta\tau} - m_u{}_\tau)}{g_c \Delta\tau} + \frac{m_{ij}}{g_c}(u_{ij} - u_u) = \quad (2.1.2)$$

$$(p_i - p_j)A + \frac{\rho g V \cos\theta}{g_c} - K_f \dot{m}_{ij}|\dot{m}_{ij}|A + \frac{\rho K_{rot}^2 \omega^2 A}{2g_c}(r_j^2 - r_i^2) + S$$

The two terms in the left hand side of the momentum equation represent the inertia of the fluid. The first one is the time dependent term and must be considered for unsteady calculations. The second term is significant when there is a large change in area or density from branch to branch. The first term in the right hand side of the momentum equation represents the pressure gradient in the branch. The pressures are located at the upstream and downstream face of a branch. The second term represents the effect of gravity. The gravity vector makes an angle ($\theta$) with the assumed flow direction vector. The third term represents the frictional effect. Friction was modeled as a product of $K_f$ and the square of the flow rate and area. $K_f$ is a function of the fluid density in the branch and the nature of flow passage being modeled by the branch. The calculation of $K_f$ for different types of flow passages has been described in detail later within this report. The fourth term in the momentum equation represents the effect of the centrifugal force. This term will be present only when the branch is rotating as shown in FIG. 8. $K_{rot}$ is the factor representing the fluid rotation. $K_{rot}$ is unity when the fluid and the surrounding solid surface rotates with the same speed. This term also requires a knowledge of the distances between the upstream and downstream faces of the branch from the axis of rotation.

A simplified form of the momentum equation has also been provided to compute choked flowrate for compressible flow in an orifice. When the inertia term is not activated and the following criteria is satisified:

$$\frac{p_j}{p_i} < p_{cr}, \tag{2.1.2.a}$$

where:

$$p_{cr} = \left(\frac{2}{\gamma+1}\right)^{\frac{\gamma}{\gamma-1}}, \tag{2.1.2.b}$$

the flow rate in a branch is calculated from:

$$\dot{m}_{ij} = C_{L_{ij}} A \sqrt{p_i \rho_i g_c \frac{2\gamma}{\gamma-1}(p_{cr})^{2/\gamma}[1-(p_{cr})^{(\gamma-1)/\gamma}]}. \tag{2.1.2.c}$$

Energy Conservation Equation

The energy conservation equation for node i, shown in FIG. 7, can be expressed mathematically as shown in Equation 2.1.3.

$$\frac{m\left(h-\frac{p}{\rho J}\right)_{\tau+\Delta\tau} - m\left(h-\frac{p}{\rho J}\right)_\tau}{\Delta \tau} = \tag{2.1.3}$$

$$\sum_{j=1}^{j=n} \{MAX[-\dot{m}_{ij}, 0]h_j - MAX[\dot{m}_{ij}, 0]h_i\} +$$

$$\frac{MAX[-\dot{m}_{ij}, 0]}{|\dot{m}_{ij}|}[(p_i - p_j) + K_{ij}\dot{m}_{ij}^2](v_{ij}A) + Q_i$$

Equation 2.1.3 shows that for transient flow, the rate of increase of internal energy in the control volume is equal to the rate of energy transport into the control volume minus the rate of energy transport from the control volume plus the rate of work done on the fluid by the pressure force plus the rate of work done on the fluid by the viscous force plus the rate of heat transfer into the control volume.

For a steady state situation, the energy conservation equation, Equation 2.1.3, states that the net energy flow from a given node must equate to zero. In other words, the total energy leaving a node is equal to the total energy coming into the node from neighboring nodes and from any external heat sources ($Q_i$) coming into the node and work done on the fluid by pressure and viscous forces. The MAX operator used in Equation 2.1.3 is known as an upwind differencing scheme which has been extensively employed in the numerical solution of Navier-Stokes equations in convective heat transfer and fluid flow applications. When the flow direction is not known, this operator allows the transport of energy only from its upstream neighbor. In other words, the upstream neighbor influences its downstream neighbor but not vice versa. The second term in the right hand side represents the work done on the fluid by the pressure and viscous force. The difference between the steady and unsteady formulation lies in the left hand side of the equation. For a steady state situation, the left hand side of Equation 2.1.3 is zero, where as in unsteady cases the left hand side of the equation must be evaluated.

Fluid Specie Conservation Equation

The flow network shown in FIG. 7 has a fluid mixture flowing in most of the branches. In order to calculate the density of the mixture, the concentration of the individual fluid species within the branch must be determined. The concentration for the $k^{th}$ specie can be written as $$\frac{(m_i c_{i,k})_{\tau+\Delta\tau} - (m_i c_{i,k})_\tau}{\Delta \tau} = \tag{2.1.4}$$

$$\sum_{j=1}^{j=n} \{MAX[-\dot{m}_{ij}, 0]c_{j,k} - MAX[\dot{m}_{ij}, 0]c_{i,k}\}$$

For a transient flow, Equation 2.1.4, states that the rate of increase of the concentration of the $k^{th}$ specie in the control volume equals the rate of transport of the $k^{th}$ specie into the control volume minus the rate of transport of the $k^{th}$ specie out of the control volume.

Like Equation 2.1.3, for steady state conditions, Equation 2.1.4 requires that the net mass flow of the $k^{th}$ specie from a given node must equate to zero. In other words, the total mass flow rate of the given specie into a node is equal to the total mass flow rate of the same specie out of that node. For steady state, the left hand side of Equation 2.1.4 is zero. For the unsteady formulation, the resident mass in the control volume is changing and therefore, the left hand side must be computed.

Thermodynamic and Thermophysical Properties

The momentum conservation equation, Equation 2.1.2, requires knowledge of the density and the viscosity of the fluid within the branch. These properties are functions of the temperatures, pressures and concentrations of fluid species for a mixture. Two thermodynamic property routines have been integrated into the program to provide the required fluid property data. GASP provides the thermodynamic and transport properties for ten fluids. These fluids include Hydrogen, Oxygen, Helium, Nitrogen, Methane, Carbon Dioxide, Carbon Monoxide, Argon, Neon and Fluorine. WASP provides the thermodynamic and transport properties for water and steam. For RP-1 fuel, a look up table of properties has been generated by a modified version of GASP. An interpolation routine has been developed to extract the required properties from the tabulated data.

Mixture Property Calculations

This section describes the procedure used to estimate the density and temperature of mixtures of real fluids. The densities of the individual fluid components of the mixture are calculated from GASP, WASP or the RP-1 property table using the pressures and the enthalpies of the fluid.

Let us assume that n number of fluids are mixing in the $i^{th}$ node. At node i, pressure, $p_i$, and enthalpy, $h_i$, are known. The problem is to calculate the density, $\rho_i$, and temperature, $T_i$, specific heat, $C_p$, specific heat ratio, $\gamma$, and viscosity, $\mu$, of the mixture at the $i^{th}$ node.

GFSSP calculates the mixture property using the following steps:

1. Calculate $T_k$ and $\rho_k$ from $p_i$ and $h_i$ using the thermodynamic property routines of the program.
2. Calculate the compressibility of each component of the mixture, $z_k$, from the equation of state for a real gas (Equation 2.1.5).

$$z_k = \frac{p_i}{\rho_k R_k T_k} \tag{2.1.5}$$

Where $R_k$ is the gas constant for $k^{th}$ fluid.

3. Calculate $T_i$ from the energy conservation equation expressed in terms of a product of specific heat and temperature instead of enthalpy (Equation 2.1.6).

$$\sum_{j=1}^{j=n}\sum_{k=1}^{k=n_f} Cp_k x_k T_j \text{MAX}[-\dot{m}_{ij}, 0] + \quad (2.1.6)$$

$$T_i = \frac{\frac{\text{MAX}[-\dot{m}_{ij}, 0]}{|\dot{m}_{ij}|}[p_i - p_j + k_{ij}\dot{m}_{ij}^2]A_{ij} + Q_i}{\sum_{j=1}^{j=n}\sum_{k=1}^{k=n_f} Cp_k x_k \text{MAX}[\dot{m}_{ij}, 0]}$$

Where $Cp_k$ is the molar specific heat and $x_k$ is the mole-fraction of the $k^{th}$ specie. Note that a steady state formulation of the energy equation (Equation 2.1.3) was used to compute $T_i$.

4. Calculate compressibility of the mixture, $z_i$, as shown in Equation 2.1.7, by taking the molar average of the component compressibility obtained in Step 2.

$$z_i = \sum_{k=1}^{k=n} x_k z_k. \quad (2.1.7)$$

Equation 2.1.7 is derived from Amagat's law of partial volume.

5. Calculate the molar density of the mixture, $\overline{\rho}_i$, from the equation of state (Equation 2.1.8).

$$\overline{\rho}_i = \frac{p_i}{\overline{z}_i \overline{R} T} \quad (2.1.8)$$

Where $\overline{R}$ is the Universal Gas Constant.

6. Calculate the mixture molecular weight, $M_i$, by taking the molar average of the component molecular weights, $M_k$, as shown in Equation 2.1.9.

$$M_i = \sum_{k=1}^{k=n} x_k M_k \quad (2.1.9)$$

7. Calculate the mass density, $\rho_i$, as shown in Equation 2.1.10, from the molar density and the molecular weight that was obtained from Step 5 and Step 6 respectively.

$$\rho_i = \overline{\rho}_i M_i \quad (2.1.10)$$

8. Calculate the viscosity and the specific heat ratio of the mixture by taking the molar average of the component properties, $\mu_k$ and $\gamma_k$, as shown in Equation 2.1.11 and Equation 2.1.12.

$$\mu_i = \sum_{k=1}^{k=n} x_k \mu_k \quad (2.1.11)$$

$$\gamma_i = \sum_{k=1}^{k=n} x_k \gamma_k \quad (2.1.12)$$

SOLUTION PROCEDURE

In the sample circuit shown in FIG. 6, pressures, temperatures, and concentrations of helium, hydrogen and oxygen are to be calculated for the 7 internal nodes; flow rates are to be calculated in the 12 branches. The total number of equations can be evaluated from the following relationship: Number of equations=Number of internal nodes*Number of scalar transport equations+Number of branches. Therefore, the total number of equations to be solved is 40 (=7×4+12). There is no explicit equation for pressure. The pressures are implicitly computed from the mass conservation equation (Equation 2.1.1). The flow rates are calculated from Equation 2.1.2. The inertia and friction terms are nonlinear in Equation 2.1.2. The pressures and mass flow rates appear in the flow rate equations. The enthalpy and concentrations are solved using Equations 2.1.3 and 2.1.4 respectively. The flow rates also appear in the enthalpy and the concentration equations. The governing equations to be solved are strongly coupled and nonlinear and therefore they must be solved by an iterative method.

Stoecker described two types of numerical methods available to solve a set of non-linear coupled algebraic equations: (1) the successive substitution method and (2) the Newton-Raphson method. In the successive substitution method, each equation is expressed explicitly to calculate one variable. The previously calculated variable is then substituted into the other equations to calculate another variable. In one iterative cycle each equation is visited. The iterative cycle is continued until the difference in the values of the variables in successive iterations becomes negligible. The advantages of the successive substitution method are its simplicity to program and its low code overhead. The main limitation, however, is finding an optimum order for visiting each equation in the model. This visiting order, which is called the information flow diagram, is crucial for convergence. Under-relaxation (partial substitution) of variables is often required to obtain numerical stability.

In the Newton-Raphson method, the simultaneous solution of a set of non-linear equations is achieved through an iterative guess and correction procedure. Instead of solving for the variables directly, correction equations are constructed for all of the variables. The intent of the correction equations is to eliminate the error in each equation. The correction equations are constructed in two steps: (1) the residual errors in all of the equations are estimated and (2) the partial derivatives of all of the equations, with respect to each variable, are calculated. The correction equations are then solved by the Gaussian elimination method. These corrections are then applied to each variable, which completes one iteration cycle. These iterative cycles of calculations are repeated until the residual error in all of the equations is reduced to a specified limit. The Newton-Raphson method does not require an information flow diagram. Therefore, it has improved convergence characteristics. The main limitation to the Newton-Raphson method is its requirement for a large amount of computer memory.

In GFSSP, a combination of the successive substitution method and the Newton-Raphson method is used to solve the set of equations. The mass and momentum conservation equations are solved by the Newton-Raphson method. The energy and specie conservation equations are solved by the successive substitution method. The underlying principle for making such a division was that the equations which are more strongly coupled are solved by the Newton-Raphson method. The equations which are not strongly coupled with the other set of equations are solved by the successive substitution method. Thus, the computer memory requirement can be significantly reduced while maintaining superior numerical convergence characteristics.

It may be further mentioned that the solution of compressible flow problems requires two iterative cycles. In compressible flows, the density is a function of pressure and temperature and the resistance coefficient ($K_f$) in Equation 2.1.2 is a function of density. Therefore, the flow resistance parameters are recalculated after attaining a converged solution for the problem with the initial flow resistance parameters. The iterative cycle for the flow resistance calculations is continued until the differences in flow resistance, densities and enthalpies in successive iteration cycles are less than the specified convergence criterion for the problem.

EXAMPLE

The working example presented here is intended to be illustrative of the present invention and should not be construed to limit its scope. Demonstrated hereby are major features of the present invention as applied to a significant fluid engineering problem. Another purpose of this example is to verify predictions of the present invention by comparing GFSSP solutions with experimental data thereby showing the significant utility of the present invention in the field of fluid engineering.

Axial Thrust Calculation in a Turbopump

Figure 9:
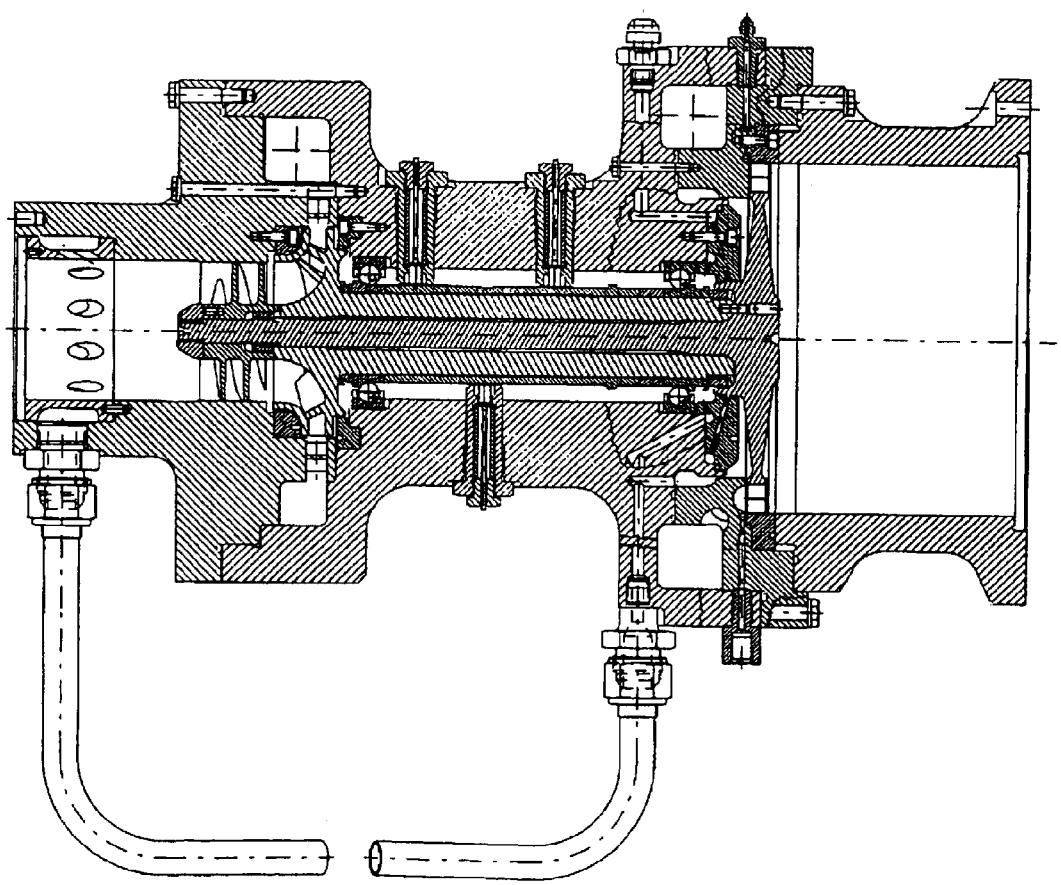
FIG. 9 is a schematic of a SIMPLEX turbopump.

Problem Considered:

It is desired to calculate the axial thrust of the SIMPLEX turbopump operating at 25,000 rpm with liquid oxygen as the operating fluid. In order to calculate axial thrust, the pressure distribution throughout the secondary flow system of the turbopump must be obtained. FIG. 9 shows a schematic of the turbopump. The pressure is known at the inducer inlet, the inducer discharge, on the back face of the impeller (upstream of the Labyrinth seal), on the front face of the impeller shroud (upstream of the Labyrinth seal), at the end of the atmospheric dump lines (2 dump lines), and on the front and back face of the turbine. The pressure at the exit of the impeller is not known, due to flow conditions at the pressure tap corresponding to the impeller discharge. (The value of the pressure at the impeller discharge must be estimated.) The values of pressure and temperature at these positions are listed in Table 3, and will be boundary conditions for the GFSSP model. Axial thrust and pressures throughout the internal flow circuit are to be calculated using GFSSP.

Figure 10:
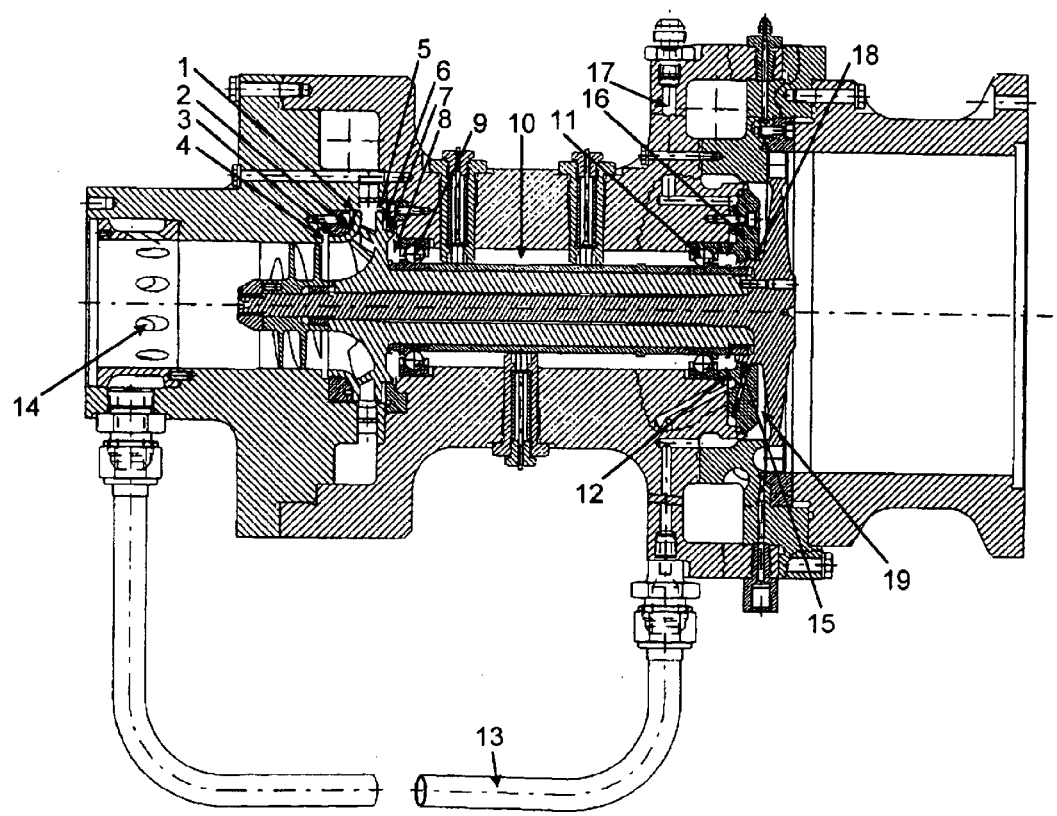
FIG. 10 is a schematic of the SIMPLEX turbopump of FIG. 9 with secondary flow passages indicated.

GFSSP Model:

FIG. 10 indicates the flow passages that will be modeled using GFSSP. The modeled passages are numbered, with each number corresponding to the passage listed below.

1. Axial flow between the impeller shroud and the housing flowing from the impeller discharge.
2. Radially inward flow between the impeller shroud and the housing.
3. Flow through the labyrinth seal at the end of the impeller shroud.
4. Radially inward flow between the end of the impeller shroud and the housing flowing into the impeller inlet.
5. Axial flow between the impeller and the housing flowing from the impeller discharge.
6. Radially inward flow between the impeller back face and the housing.
7. Flow through the labyrinth seal at the lip on the back face of the impeller.
8. Radially inward flow between the impeller back face and the housing flowing into the first bearing.
9. Flow through the first rolling element bearing.
10. Axial flow along the impeller shaft between the bearings.
11. Flow through the second rolling element bearing.
12. Flow through eight radially outward holes (for return lines).
13. Flow through two external return lines.
14. Flow through eight radially inward holes flowing into inducer inlet.
15. Flow through the first turbine-end labyrinth seal.
16. Flow through twenty two radially outward holes (for dump lines).
17. Flow through two external dump lines.
18. Flow through the second turbine-end labyrinth seal.
19. Radially outward flow between the front face of the turbine and the housing.

Additionally, a dummy branch connects the front face and the back face of the turbine for the calculation of axial thrust.

TABLE 3

Boundary Conditions

| Boundary Node Pressure | Boundary Node Temperature |
|---|---|
| $P_{Im\ Dis}$ = 1100.0 psia (Assumed) | $T_{Im\ Dis}$ = −286.6° F. (Assumed) |
| $P_{Im\ Shrd}$ = 1078.0 psia | $T_{Im\ Shrd}$ = −286.6° F. (Assumed) |
| $P_{Ind\ Dis}$ = 346.2 psia | $T_{Ind\ Dis}$ = −286.6° F. |
| $P_{Im\ B.Face}$ = 1025.0 psia | $T_{Im\ B.Face}$ = −286.6° F. |
| $P_{Turb\ F.Face}$ = 62.6 psia | $T_{Turb\ F.Face}$ = −265.6° F. |
| $P_{Dump}$ = 14.7 psia (Assumed) | $T_{Dump}$ = −286.6° F. (Assumed) |
| $P_{Ind\ Inlet}$ = 93.7 psia | $T_{Ind\ Inlet}$ = −286.6° F. |
| $P_{Turb\ B.Face}$ = 14.7 psia (Assumed) | $T_{Turb\ B.Face}$ = −286.6° F. (Assumed) |

Figure 11:
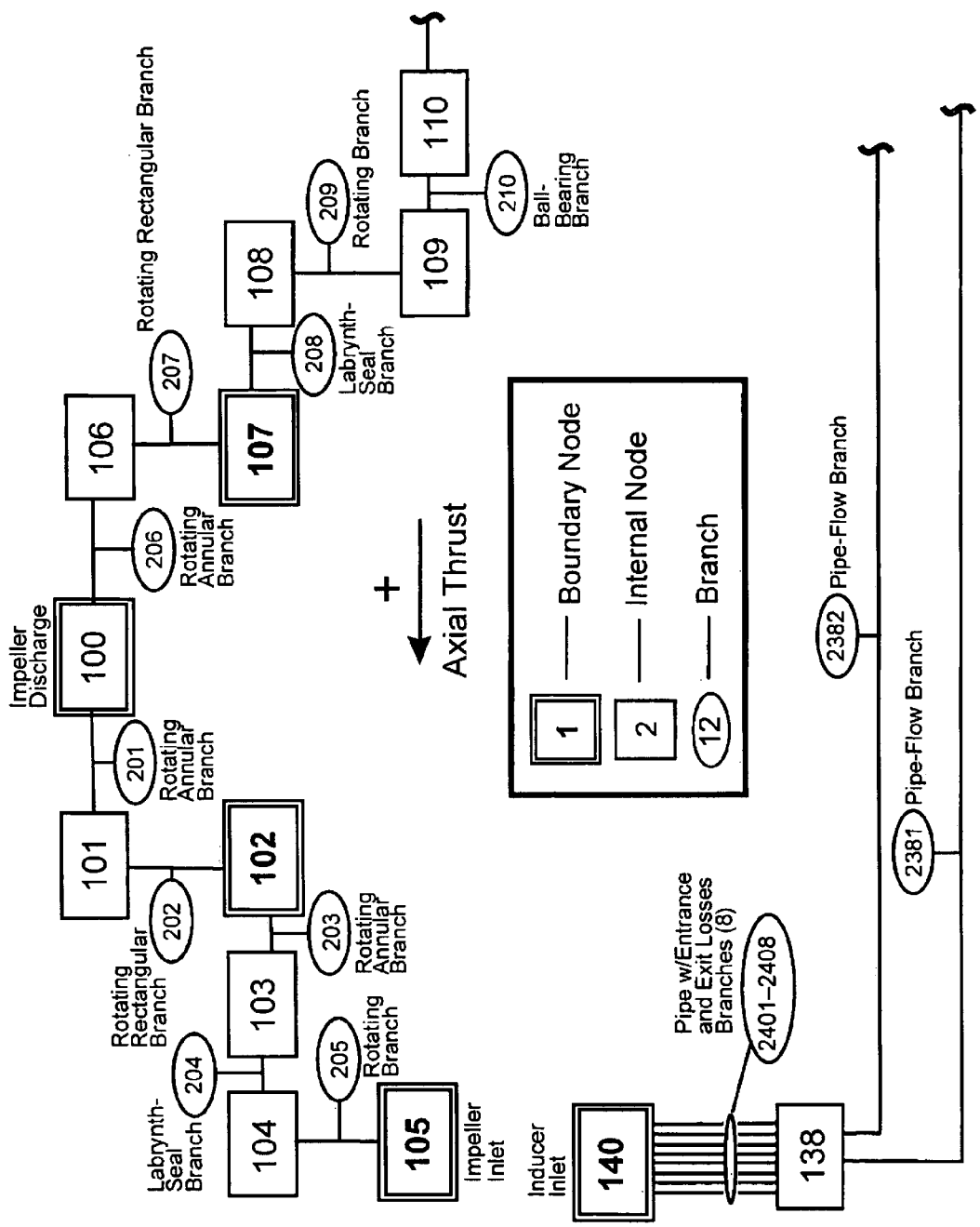
FIGS. 11 and 11a are a schematic of the GFSSP model of the secondary flow passages of FIG. 10.
Figure 11A:
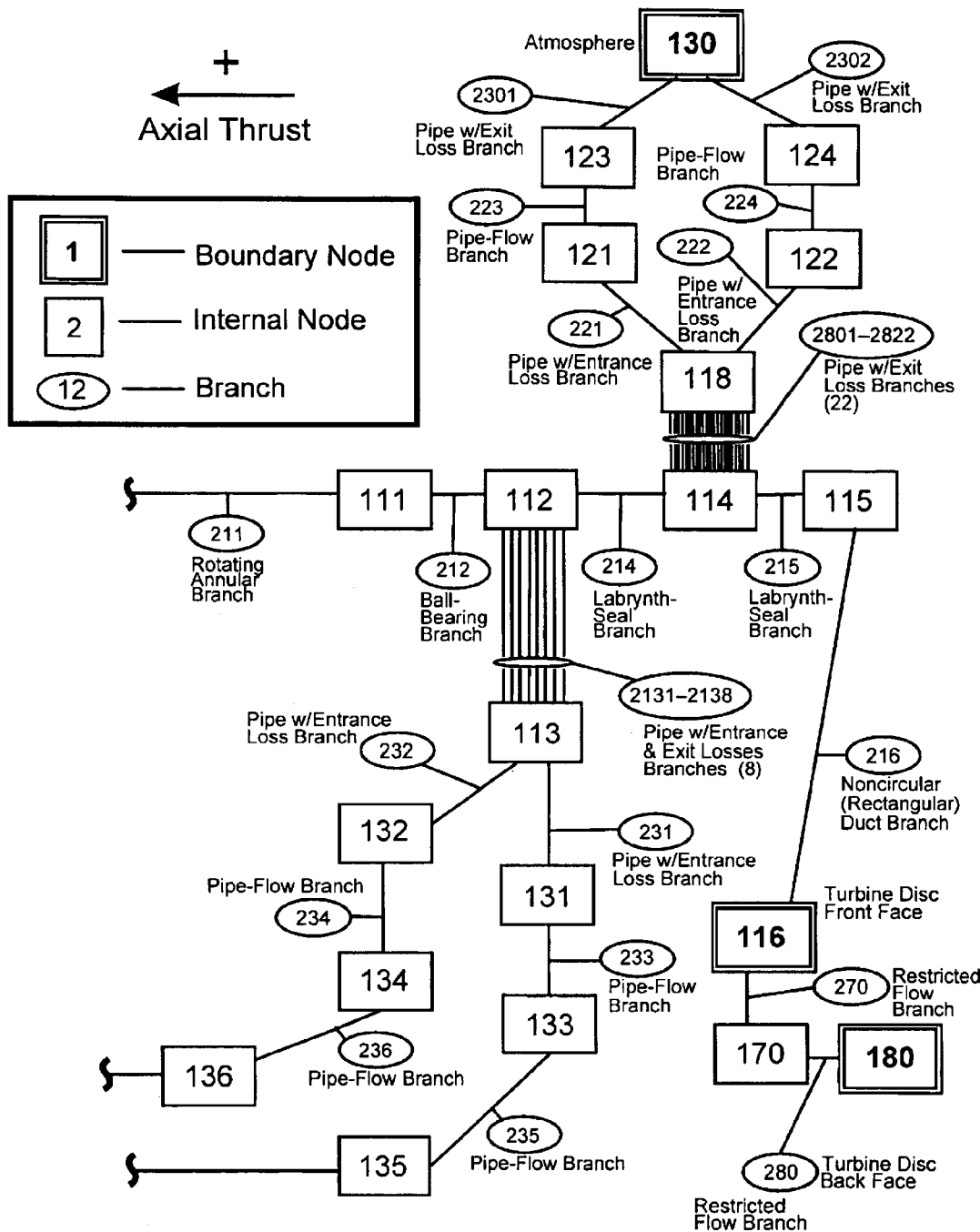

The GFSSP model of the secondary flow passages for this turbopump is shown schematically in FIGS. 11 and 11a. The resistance options used in this model are listed in Table 4. Heat is added to nodes 110 and 112 to account for the heat transferred from the bearings. Heat is also added to node 109 to match the temperature at that node with the experimental data.

TABLE 4

Resistance Options Utilized in the GFSSP Turbopump Model

| Resistance Option | Resistance Option Description | Branches |
|---|---|---|
| 1 | Pipe Flow | 223, 224, 233, 234, 235, 236, 2381, 2382 |
| 2 | Flow Through a Restriction | 202, 205, 207, 209, 210, 212 |
| 3 (Sub-Option 1) | Non-Circular Duct (Rectangle) | 216 |
| 4 | Pipe Flow with Entrance and/or Exit Loss | 221, 222, 231, 232, 2131–2138, 2301, 2302, 2401–2408, 2801–2822 |
| 9 | Rotating Annular Branch | 201, 203, 206, 211 |
| 11 | Labyrinth Seal | 204, 208, 214, 215 |

Figure 12:
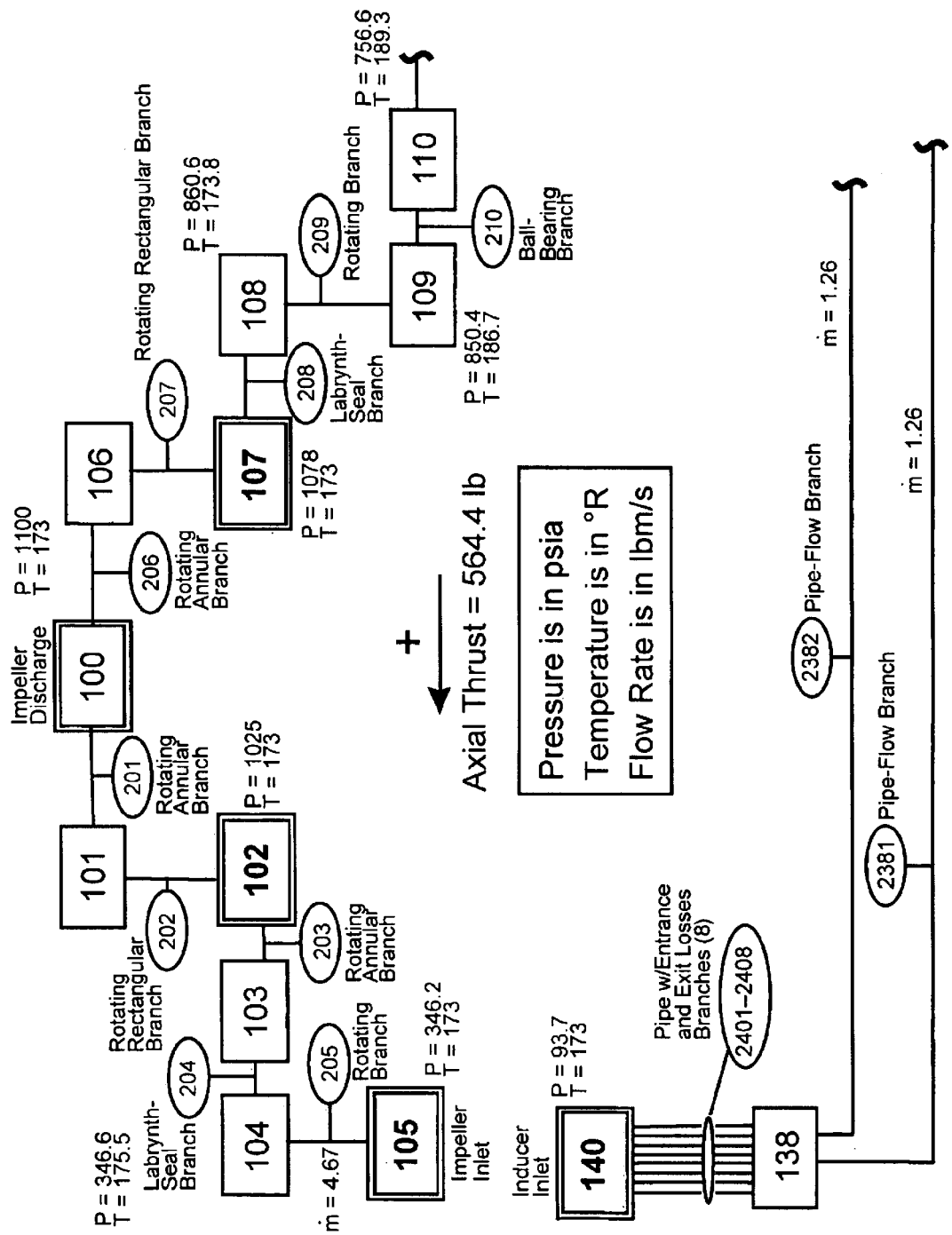
Figure 12A:
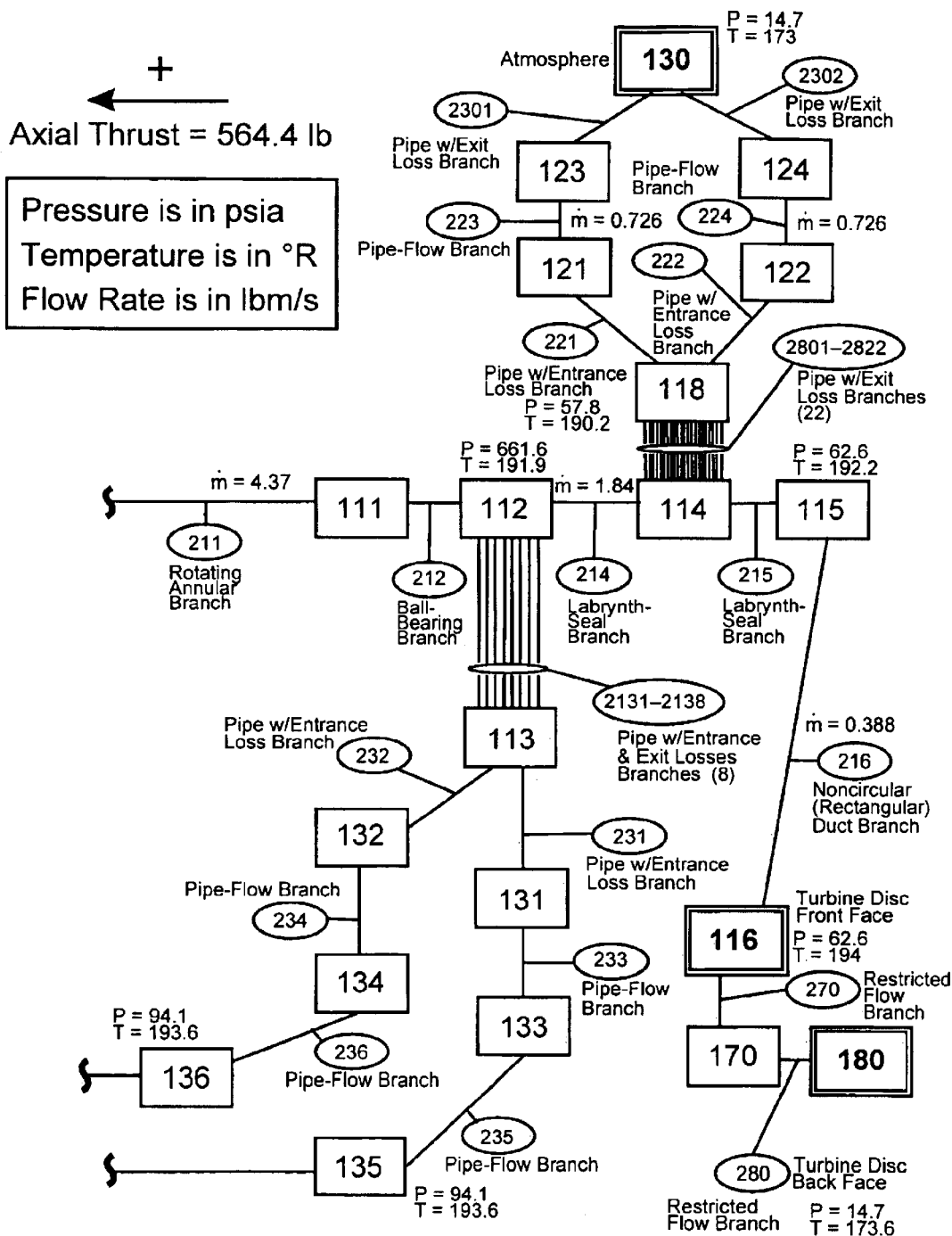
Figure 13:
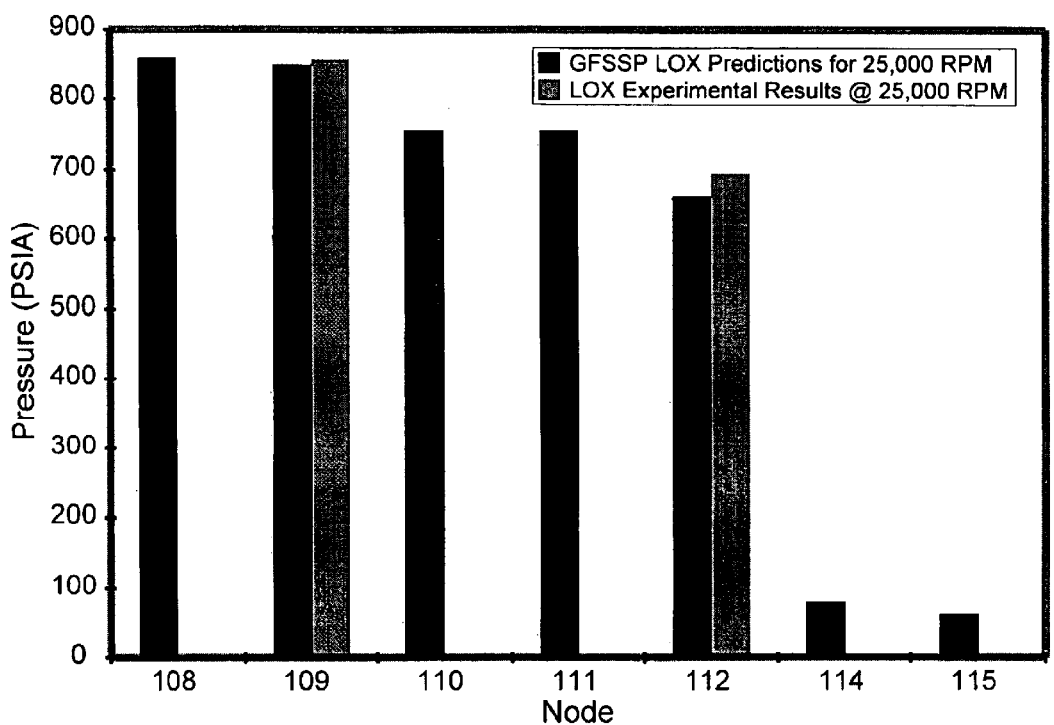
FIG. 13 is a representation of pressure prediction of the GRSSP SIMPLEX turbopump model compared with experimental data.
Figure 14:
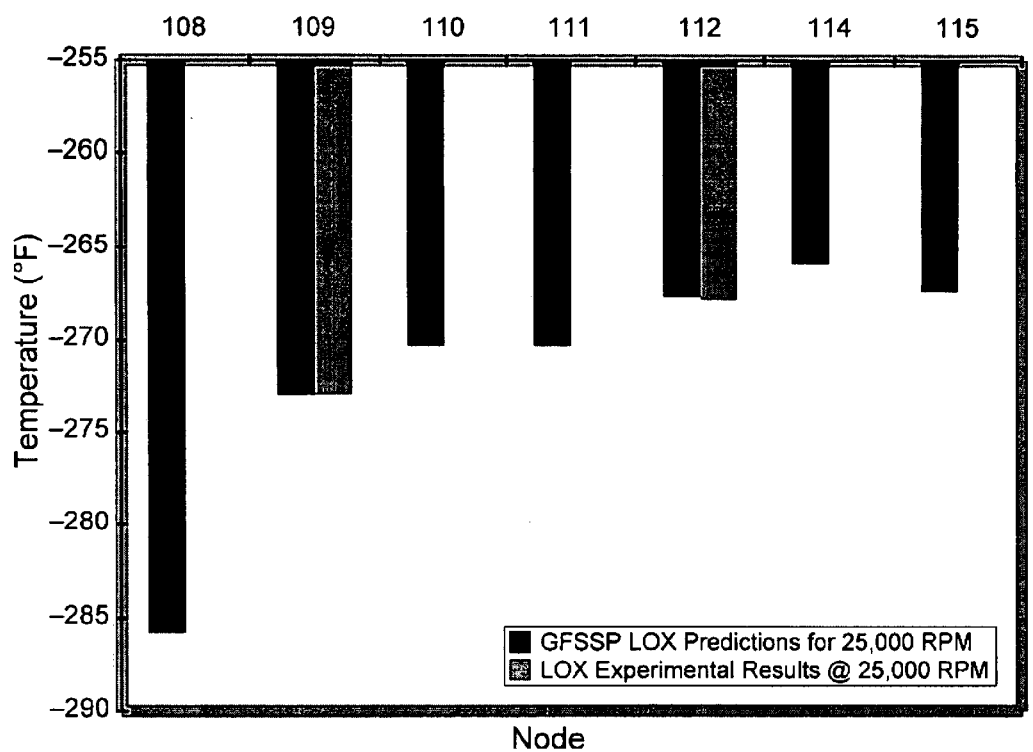
FIG. 14 is a representation of temperature predictions of the GFSSP SIMPLEX turbopump model compared with experimental data.

The results obtained from the GRSSP turbopump model are presented in FIGS. 12, 13, and 14. FIG. 12 shows the GRSSP SIMPLEX turbopump model results overlaid onto FIG. 11, indicating that the axial thrust for this model is 564.4 pounds force. FIGS. 13 and 14 show the GRSSP SIMPLEX turbopump model pressure predictions compared to experimental data and the GFSSP SIMPLEX turbopump model temperature predictions compared to experimental data, respectively. FIG. 13 demonstrates that the present model's pressures compare most reasonably with the test data, and FIG. 14 demonstrates that the present model's temperatures compare almost identically with the test data.

Figure 15:
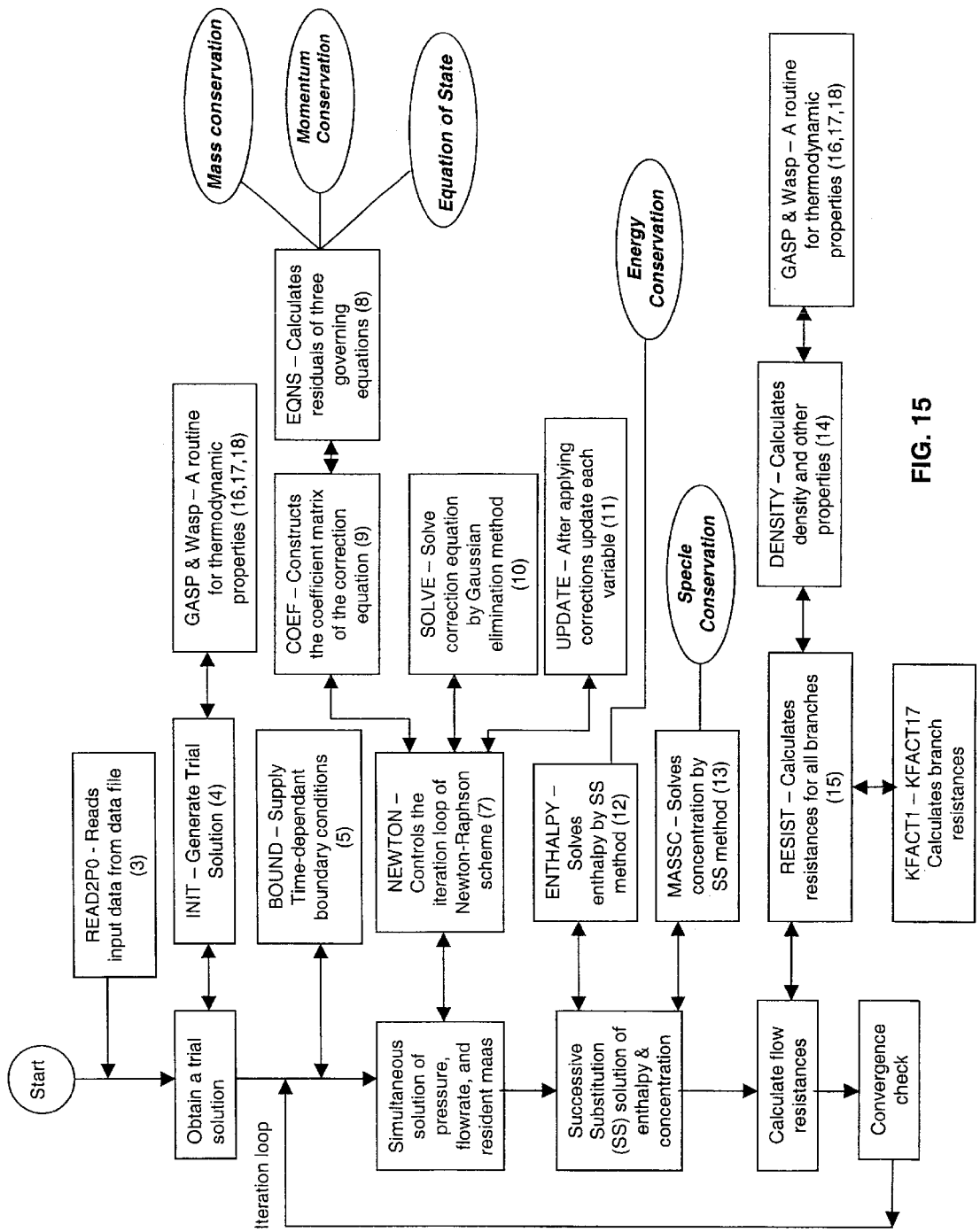
FIG. 15 is a flowchart showing major subroutines of the present invention, which are identified by a number in parentheses.

In summation, FIG. 15 shows the major subroutines of the present invention, and identifies these major subroutines by a number in parentheses. This figure also shows the hierarchical logical structure among subroutines, and clearly shows the iterative looping.

We claim:

1. A process for analyzing steady state and transient flow in a complex fluid network to provide modeling of phase changes, compressibility, mixture thermodynamics, and external body forces, which process comprises the following cooperative combination of procedural steps and major structural elements implemented on a computer:

(a) a main program readable on the computer for driving all subroutines, which are set forth hereinafter;

(b) a first subroutine for interactively generating input specifications including numbering and classifying nodes and connecting branches for defining a flow model, as well as initial and boundary conditions;

(c) a second subroutine in cooperation with the first subroutine for writing the input specifications into a text file;

(d) a third subroutine for reading the input specifications from the text file;

(e) a fourth subroutine for generating a trial solution by interacting with the fourteenth, fifteenth, and sixteenth subroutine as set forth herein below;

(f) a fifth subroutine for supplying time dependent boundary conditions;

(g) a sixth subroutine for printing header information, the initial and boundary conditions, and all variables at nodes and branches;

(h) a seventh subroutine for conducting a Newton-Raphson solution of mass conservation, flow rate, and energy conservation equations by interacting with each of the eighth, ninth, tenth, and eleventh subroutines as set forth hereinafter;

(i) an eighth subroutine for interacting with the seventh subroutine and generating the mass conservation, flow rate, and energy conservation equations;

(j) a ninth subroutine for interacting with the seventh subroutine and calculating coefficients of correction equations;

(k) a tenth subroutine for interacting with the seventh subroutine and solving the correction equations by Gaussian elimination method;

(l) an eleventh subroutine for interacting with the seventh subroutine and updating each variable after corrections have been applied;

(m) a twelfth subroutine for obtaining a solution of enthalpy by a successive substitution method;

(n) a thirteenth subroutine for obtaining a solution of concentrations by a successive substitution method;

(o) a fourteenth subroutine for calculating fluid density at each node;

(p) a fifteenth subroutine for calculating resistance for each branch, following the calculation of fluid density at each node;

(q) a sixteenth subroutine for calculating thermodynamic and thermophysical properties of a member selected from the group consisting of hydrogen, oxygen, helium, nitrogen, methane, carbon dioxide, carbon monoxide, argon, neon, and fluorine;

(r) a seventeenth subroutine for calculating thermodynamic and thermophysical properties of water;

(s) an eighteenth subroutine for reading thermodynamic and thermophysical properties of kerosene from the property tables; and (t) a nineteenth subroutine for printing all variables at nodes and branches to file.

2. The data processing system of claim 1, wherein the fourteenth subroutine calculates fluid density at each node for fluids employing equations of state.

3. The data processing system of claim 2, wherein the fourteenth subroutine calculates fluid density at each node for fluids mixtures using laws of partial pressure.

* * * * *